(12) United States Patent
Shahriar et al.

(10) Patent No.: US 11,044,161 B2
(45) Date of Patent: Jun. 22, 2021

(54) METHOD AND SYSTEM FOR LATENCY-AWARE EMBEDDING OF A VIRTUAL NETWORK ONTO A SUBSTRATE OPTICAL NETWORK

(71) Applicants: Huawei Technologies Canada Co., Ltd., Kanata (CA); University of Waterloo, Waterloo (CA)

(72) Inventors: Nashid Shahriar, Waterloo (CA); Shihabur Rahman Chowdhury, Kitchener (CA); Raouf Boutaba, Waterloo (CA); Jeebak Mitra, Ottawa (CA); Mahdi Hemmati, Ottawa (CA)

(73) Assignees: HUAWEI TECHNOLOGIES CANADA CO., LTD., Kanata (CA); UNIVERSITY OF WATERLOO, Waterloo (CA)

( * ) Notice: Subject to any disclaimer, the term of this patent is extended or adjusted under 35 U.S.C. 154(b) by 0 days.

(21) Appl. No.: 16/600,103

(22) Filed: Oct. 11, 2019

(65) Prior Publication Data
US 2021/0111959 A1 Apr. 15, 2021

(51) Int. Cl.
*H04L 12/24* (2006.01)
*G06F 9/455* (2018.01)
*H04J 14/02* (2006.01)

(52) U.S. Cl.
CPC ...... *H04L 41/0896* (2013.01); *G06F 9/45558* (2013.01); *H04J 14/021* (2013.01); *H04L 41/12* (2013.01); *G06F 2009/45595* (2013.01)

(58) Field of Classification Search
None
See application file for complete search history.

(56) References Cited

U.S. PATENT DOCUMENTS

| 8,635,616 | B2 | 1/2014 | Yang et al. |
| 8,639,794 | B2 | 1/2014 | Decusatis et al. |
| 9,455,919 | B2* | 9/2016 | Senarath ............... H04L 47/823 |

(Continued)

OTHER PUBLICATIONS

Bórquez-Paredes et al. "Network Virtualization Over Elastic Optical Networks: A Survey of Allocation Algorithms". Published Jun. 21, 2017. (Year: 2017).*

(Continued)

*Primary Examiner* — Scott B Christensen
(74) *Attorney, Agent, or Firm* — BCF LLP

(57) ABSTRACT

The disclosed s, structures, and methods are directed to a method and a system for embedding a virtual network onto the substrate optical network comprising embedding the plurality of virtual nodes onto the plurality of substrate nodes in accordance with the plurality of location constraints, computing end-to-end latency associated with a plurality of substrate paths connecting a source substrate node and a destination substrate node, wherein the plurality of substrate paths contain the plurality of substrate links and the plurality of substrate nodes, and embedding a virtual link connecting a source virtual node and a destination virtual node onto the one of the plurality of substrate paths connecting the source substrate node and the destination substrate node, wherein the end-to-end latency associated with the one of the plurality of substrate paths is less than or equal to a maximum allowable latency for the virtual link.

21 Claims, 15 Drawing Sheets

(56) References Cited

U.S. PATENT DOCUMENTS

| | | | |
|---|---|---|---|
| 2011/0199939 A1* | 8/2011 | Zi .......................... | H04L 45/42 370/254 |
| 2016/0191194 A1* | 6/2016 | Wood ................. | H04J 14/0267 398/58 |
| 2017/0033976 A1* | 2/2017 | Ahmed ............... | H04L 41/0672 |
| 2017/0078152 A1* | 3/2017 | Ahmed ............... | H04L 12/4641 |
| 2017/0099211 A1* | 4/2017 | Iovanna .............. | H04L 41/5019 |
| 2017/0104688 A1* | 4/2017 | Mirahsan ............ | H04L 41/0896 |
| 2018/0006893 A1* | 1/2018 | Iovanna .............. | H04L 41/0896 |
| 2018/0227244 A1* | 8/2018 | Zhang .................. | H04L 47/827 |

OTHER PUBLICATIONS

Ceccarelli et al., Framework for Abstraction and Control of Te Networks (ACTN), Aug. 2018, IETF Datatracker, retrieved from https://datatracker.ietf.org/doc/rfc8453/ on Oct. 3, 2019.
Trowbridge et al., Flex Ethernet 2.0 Implementation Agreement, Jun. 22, 2018, Optical Internetworking Forum, retrieved from https://www.oiforum.com/wp-content/uploads/2019/01/OIF-FLEXE-02.0-1.pdf on Oct. 3, 2019.
Parvez et al., A Survey on Low Latency Towards 5G: RAN, Core Network and Caching Solutions, IEEE Communications Surveys & Tutorials, vol. 20, No. 4, Fourth Quarter 2018, pp. 3098-3130.
Shahriar et al., Achieving a Fully-Flexible Virtual Network Embedding in Elastic Optical Networks, IEEE INFOCOM, Paris, France, 2019, pp. 1756-1764.
International Search Report and Written Opinion of PCT/CA2020/051180; Ali Mian; dated Nov. 4, 2020.

\* cited by examiner

METHOD AND SYSTEM FOR LATENCY-AWARE EMBEDDING OF A VIRTUAL NETWORK ONTO A SUBSTRATE OPTICAL NETWORK

CROSS-REFERENCE TO RELATED APPLICATIONS

This is the first application filed for the instantly disclosed technology.

FIELD OF THE INVENTION

The present disclosure generally relates to the field of optical communication networks and, in particular, to methods and system for latency-aware embedding a virtual network onto a substrate optical network.

BACKGROUND

Typical optical networks based on Dense Wavelength Division Multiplexing (DWDM) are capable of providing bandwidth up to 4.4 THz. Such networks generally employ fixed-grid spectrums and fixed-rate transceivers and hence are less capable of handling heterogeneous and variable traffic demands. In a conventional fixed-grid spectrum system, each block of spectrum is either 50 GHz or 100 GHz. If channels larger than this are required, the need can be served by bringing up multiple 50 or 100 GHz channels (also referred to as lighting up the channels) and allowing a higher network layer to manage them as a logical link. To address demand higher bandwidth connections, without inefficiently allocating spectrum, a more flexible spectrum allocation is provided by so-called flex-grid spectrums for optical networks. Flex-grid based optical networks provide an effective way of increasing network-level operational efficiency by allowing the possibility of per-link bandwidth allocation in granular frequency slots as small as 12.5 GHz rather than the more monolithic 50 or 100 GHz per-link as in case of previous International Telecommunication Union (ITU) grid. The overall capacity of these allocated links is a function of the transceivers employed at the terminal ends of the link, allowing for a single channel to be allocated sufficient spectrum, while minimizing the unused allocated resources.

Elastic Optical Networks (EONs) are a result of flex-grid optical networks being deployed with adaptive modulation and coding capabilities of flex-rate optical transceivers. EONs can be used to provide dynamic resource allocation in mesh-like optical networks to address dynamic, diverse and bursty traffic demands. These traffic demands can be better addressed using EONs because of the ability to increase or decrease the spectrum allocation in accordance with customer needs. Along with advances in coherent-transmission technology, EONs allow the tuning of transmission parameters such as baud rate, modulation format and forward error correction (FEC) overhead.

Low-latency communications is becoming a fundamental quality-of-service (QoS) requirement for many current and emerging applications such as intelligent transport, industry automation, immersive media experience through virtual and augmented reality, online multi-player gaming, high-definition streaming and video conferencing, and high frequency trading. While much focus has been addressed to the radio connection to the terminal devices, the use of a virtualized core network meeting the stringent latency requirements is also required. Those skilled in the art will appreciate that a virtualized network makes use of virtualized network nodes/functions instantiated upon physical computing and storage resources, and connected together using virtualized links. The virtualized links between two functions will need to be properly created to serve the required QoS.

Different QoS requirements for different types of traffic can be satisfied by creating different virtual connections (or different virtual network slices) with different latency parameters. As fifth generation (5G) networks are more widely deployed, they are expected to support a wide range of quality-of-service (QoS) requirements, including ultra-low latency communications. Each different QoS can be served by the creation of a different link in the underlying substrate network (SN). Each of these links may be served using a different frequency slots associated with the optical spectrum, each tailored to a different QoS (e.g., low latency, high-bandwidth, high reliability), on top of a substrate optical network (SN).

Network slices can be provided in the form of virtual networks (VNs) each composed of its own set of virtual nodes and virtual links embedded in (or instantiated upon the resources of) the underlying optical SNs. Each SN can comprise optical nodes and substrate optical links, and may be owned by a different network operator than the next SN. Each network slice can be managed and operated by service providers, forming a two-tier architecture. According to ACTN framework (IETF RFC8453), these VNs can be used to host virtual network services (VNSs), requested by enterprise customers.

A challenge in instantiating VNs in support of applications requiring ultra-low latency communications is to provide a mechanism for efficient mapping of VN nodes and links on the optical SN, also known as Virtual Network Embedding (VNE), which minimizes SN resource consumption while satisfying the requested end-to-end latency constraints. The problem of VNE accounting for latency constraints although crucial to the efficient functioning of next generation networks, has received very little attention heretofore.

In some previous approaches to account for latency, the requirements have been modeled as a constraint applied on the virtual links of the VN (i.e., each virtual link is mapped while satisfying a given latency target for that particular link only). However, applications typically require that a given latency target be met along an entire path between application end nodes. Moreover, per-virtual-link latency constraints also restrict the substrate paths that can be used for mapping individual virtual links.

Consequently, as part of the strict latency requirements of various emerging user applications including those enabled by 5G, there is a pressing need for solutions and algorithms for resource allocation and virtualization of optical transport networks that are capable of ensuring low-latency operation based on the Service Level Agreement (SLA).

SUMMARY

An object of the present disclosure is to provide a method for latency-aware embedding of a virtual network onto a substrate optical network comprising a plurality of substrate nodes and a plurality of substrate links connecting the substrate nodes, the method comprising receiving a virtual network topology and virtual network constraints associated with the virtual network, for embedding onto the substrate optical network, the virtual network topology comprising a plurality of virtual nodes, a plurality of virtual links connecting the virtual nodes, a demand bandwidth associated with each of the plurality of virtual links, the virtual network constraints comprising a plurality of location constraints associated with the plurality of virtual nodes, each location constraint providing an indication of at least one of the plurality of substrate nodes onto which one of the plurality of virtual nodes can be embed, a latency constraint set associated with the plurality of virtual links connecting the virtual nodes, embedding the virtual network onto the substrate optical network comprising embedding the plurality of virtual nodes onto the plurality of substrate nodes in accordance with the plurality of location constraints, computing end-to-end latency associated with a plurality of substrate paths connecting a source substrate node and a destination substrate node, wherein the plurality of substrate paths contain the plurality of substrate links and the plurality of substrate nodes, embedding a virtual link connecting a source virtual node and a destination virtual node onto the one of the plurality of substrate paths connecting the source substrate node and the destination substrate node, wherein the end-to-end latency associated with the one of the plurality of substrate paths is less than or equal to a maximum allowable latency for the virtual link.

In accordance with other aspects of the present disclosure, the method, wherein the end-to-end latency associated with the one of the plurality of substrate paths is defined as:

$$L_p = L_n + len(p)L_{prop} + n_{amp}(p)L_{amp} + (|p|+1)L_{roadm}$$

Where $L_n$ is a delay introduced at the source substrate node and the destination substrate node, len(p) is a physical length of the one of the plurality of substrate paths p, $L_{prop}$ is a propagation delay, $n_{amp}$ is a total number of amplifiers associated with the one of the plurality of substrate paths p, $L_{amp}$ is a delay introduced by one of the amplifiers associated with the one of the plurality of substrate paths p, |p| is a total number of the plurality of substrate links associated with the one of the plurality of substrate paths p, and $L_{roadm}$ is a delay introduced by a reconfigurable optical add-drop multiplexer (ROADM) present along the one of the plurality of substrate paths p.

In accordance with other aspects of the present disclosure, the method, wherein the end-to-end latency further comprising a differential delay requirement given by:

$$\forall \bar{e} \in \bar{E}: \left(\max_{p \in P_{\bar{e}}} L_p - \min_{p \in P_{\bar{e}}} L_p\right) \leq DD_{max}$$

Where $\bar{E}$ is a set of individual virtual links $\bar{e}$, $P_{\bar{e}}$ is a set of substrate paths used for embedding splitting of the plurality of virtual links $\bar{e} \in \bar{E}$, $DD_{max}$ is a maximum allowable differential delay.

In accordance with other aspects of the present disclosure, the method, further comprising determining the embedding of the virtual network using an integer linear programming (ILP) formulation.

In accordance with other aspects of the present disclosure, the method, wherein an objective function associated with the ILP formulation is given by;

$$\text{minimize}\left(\sum_{\forall \bar{e} \in \bar{E}} \sum_{\forall p \in P_{\bar{e}}^k} \sum_{\forall t \in T_{\bar{e}p}} \sum_{i=1}^{q} \sum_{\forall s \in S} y_{\bar{e}ptis} \times |p| + \right.$$

$$\epsilon_1 \sum_{\forall \bar{e} \in \bar{E}} \sum_{\forall p \in P_{\bar{e}}^k} \sum_{\forall t \in T_{\bar{e}p}} \sum_{i=1}^{q} \sum_{\forall s \in S} y_{\bar{e}ptis} \times len(p) +$$

$$\left. \epsilon_2 \sum_{\forall \bar{e} \in \bar{E}} \sum_{\forall p \in P_{\bar{e}}^k} \sum_{\forall t \in T_{\bar{e}p}} \sum_{i=1}^{q} w_{\bar{e}pti}\right)$$

Where $P_{\bar{e}}^k$ is set of k shortest substrate paths connecting the source substrate node and the destination substrate node for each virtual link $\bar{e} \in \bar{E}$, $T_{\bar{e}p}$, is a set of admissible transmission configurations t, q is a maximum number of allowable splits in the one of the k shortest substrate paths, S is a set of equal-width frequency slots s $\in_1$ is selected in a manner that the second term in the objective function is effective only when multiple solutions have same value for the first part, $\in_2$ is selected in a manner that the third term in the objective function is effective only when multiple solutions have same value for the first part and second part, $y_{\bar{e}ptis}$ is a relationship between the one of the k shortest substrate paths, frequency slots s associated with the plurality of substrate links between the one of the k shortest substrate paths, one of the virtual links J, one of the admissible transmission configurations t, and one of the allowable splits, $w_{\bar{e}pti}$ is a relationship between the one of the k shortest substrate paths, one of the virtual links $\bar{e}$, one of the admissible transmission configurations t, and one of the allowable splits.

In accordance with other aspects of the present disclosure, the method, The method of claim 5, wherein $y_{\bar{e}ptis}$ is given by:

$$y_{\bar{e}ptis} = \begin{cases} 1 \text{ if } \bar{e} \in \bar{E} \text{ uses } s \in S \text{ on path } p \in P_{\bar{e}}^k \text{ with} \\ \quad \text{the } i-th \text{ instance of } t \in T_{\bar{e}p} \\ 0 \text{ Otherwise} \end{cases}$$

In accordance with other aspects of the present disclosure, the method, wherein $w_{\bar{e}pti}$ given by:

$$w_{\bar{e}pti} = \begin{cases} 1 \text{ if } \bar{e} \in \bar{E} \text{ uses } i-th \text{ instance of } t \in T_{\bar{e}p} \text{ on} \\ \quad \text{path } p \in P_{\bar{e}}^k \\ 0 \text{ Otherwise} \end{cases}$$

In accordance with other aspects of the present disclosure, the method, wherein each of the admissible transmission configuration t is comprising of a specific baud-rate b, a modulation format m and a forward error correction code (FEC) overhead f.

In accordance with other aspects of the present disclosure, the method, wherein the substrate optical network in an Elastic Optical network.

In accordance with other aspects of the present disclosure, the method, further comprising determining the embedding of the virtual network using a heuristic approach. wherein the heuristic approach further comprising estimating an upper bound of an end-to-end latency budget in accordance with the set of latency constraints associated with the plurality of virtual links, based on the upper bound of the latency budget, generating an allowed set of substrate paths for embedding the plurality of virtual links, In accordance with other aspects of the present disclosure, the method, selecting a most constrained virtual link from a set of unmapped virtual links and the plurality of virtual links associated with the allowed set of substrate paths, wherein the most constrained virtual link is in terms of end-to end path latency as well as in terms of in terms of availability of frequency slots, computing an optimal solution for the one of the plurality of substrate paths connecting the source substrate node and the destination substrate node based on the selected most constrained virtual link, the allowed set of substrate paths, and a set of admissible transmission configurations t, allocating frequency slots to the plurality of substrate links associated with the one of the plurality of substrate paths.

In accordance with other aspects of the present disclosure, the method, wherein allocating frequency slots comprises allocating same contiguous set of frequency slots to all of the plurality of substrate links connecting the source substrate node and the destination substrate node.

In accordance with other aspects of the present disclosure, the method, wherein selecting the most constrained virtual link further comprising ordering the set of unmapped virtual links and virtual links associated with the allowed set of substrate paths in accordance with associated number of usable frequency slots and end-to-end latency constraints less than or equal to a maximum allowable latency for the virtual link.

In accordance with other aspects of the present disclosure, the method, wherein computing the optimal solution is based on maximum allowable end-to-end latency for the virtual link and at least one of a minimum frequency slot requirement, load balancing, and minimum blocking probability.

In accordance with other aspects of the present disclosure, there is provided a system for latency-aware embedding of a virtual network onto a substrate optical network comprising a plurality of substrate nodes and a plurality of substrate links connecting the substrate nodes, the method comprising a processing unit for executing instructions, and a memory unit for storing instructions, which when executed by the processor configure the system to perform steps for receiving a virtual network topology and virtual network constraints associated with the virtual network, for embedding onto the substrate optical network, the virtual network topology comprising a plurality of virtual nodes, a plurality of virtual links connecting the virtual nodes, a demand bandwidth associated with each of the plurality of virtual links, the virtual network constraints comprising a plurality of location constraints associated with the plurality of virtual nodes, each location constraint providing an indication of at least one of the plurality of substrate nodes onto which one of the plurality of virtual nodes can be embed, a latency constraint set associated with the plurality of virtual links connecting the virtual nodes, embedding the virtual network onto the substrate optical network comprising embedding the plurality of virtual nodes onto the plurality of substrate nodes in accordance with the plurality of location constraints, computing end-to-end latency associated with a plurality of substrate paths connecting a source substrate node and a destination substrate node, wherein the plurality of substrate paths contain the plurality of substrate links and the plurality of substrate nodes, embedding a virtual link connecting a source virtual node and a destination virtual node onto the one of the plurality of substrate paths connecting the source substrate node and the destination substrate node, wherein the end-to-end latency associated with the one of the plurality of substrate paths is less than or equal to a maximum allowable latency for the virtual link.

In accordance with other aspects of the present disclosure, the system, wherein the end-to-end latency associated with the one of the plurality of substrate paths is defined as:

$$L_p = L_n + len(p)L_{prop} + n_{amp}(p)L_{amp} + (|p|+1)L_{roadm}$$

Where $L_n$ is a delay introduced at the source substrate node and the destination substrate node, len(p) is a physical length of the one of the plurality of substrate paths p, $L_{prop}$ is a propagation delay, $n_{amp}$ is a total number of amplifiers associated with the one of the plurality of substrate paths p, $L_{amp}$ is a delay introduced by one of the amplifiers associated with the one of the plurality of substrate paths p, $|p|$ is a total number of the plurality of substrate links associated with the one of the plurality of substrate paths p, and $L_{roadm}$ is a delay introduced by a reconfigurable optical add-drop multiplexer (ROADM) present along the one of the plurality of substrate paths p.

In accordance with other aspects of the present disclosure, the system, further comprising determining the embedding of the virtual network using an integer linear programming (ILP) formulation.

In accordance with other aspects of the present disclosure, the system, wherein an objective function associated with the ILP formulation is given by;

$$\text{minimize}\left(\sum_{\forall \bar{e} \in E} \sum_{\forall p \in P_{\bar{e}}^k} \sum_{\forall t \in T_{\bar{e}p}} \sum_{i=1}^{q} \sum_{\forall s \in S} y_{\bar{e}ptis} \times |p| + \in_1 \right.$$

$$\sum_{\forall \bar{e} \in E} \sum_{\forall p \in P_{\bar{e}}^k} \sum_{\forall t \in T_{\bar{e}p}} \sum_{i=1}^{q} \sum_{\forall s \in S} y_{\bar{e}ptis} \times len(p) + \in_2$$

$$\left. \sum_{\forall \bar{e} \in E} \sum_{\forall p \in P_{\bar{e}}^k} \sum_{\forall t \in T_{\bar{e}p}} \sum_{i=1}^{q} w_{\bar{e}pti} \right)$$

Where $P_{\bar{e}}^k$ is set of k shortest substrate paths connecting the source substrate node and the destination substrate node for each virtual link $\bar{e} \in E$, $T_{\bar{e}p}$ is a set of admissible transmission configurations t, q is a maximum number of allowable splits in the one of the k shortest substrate paths, S is a set of equal-width frequency slots $s \in_1$ is selected in a manner that the second term in the objective function is effective only when multiple solutions have same value for the first part, $\in_2$ is selected in a manner that the third term in the objective function is effective only when multiple solutions have same value for the first part and second part, $y_{\bar{e}ptis}$ is a relationship between the one of the k shortest substrate paths, frequency slots s associated with the plurality of substrate links between the one of the k shortest substrate paths, one of the virtual links $\bar{e}$, one of the admissible transmission configurations t, and one of the allowable splits, $w_{\bar{e}pti}$ is a relationship between the one of the k shortest substrate paths, one of the virtual links $\bar{e}$, one of the admissible transmission configurations t, and one of the allowable splits.

In accordance with other aspects of the present disclosure, the system, wherein the substrate optical network in an Elastic Optical network.

In accordance with other aspects of the present disclosure, the system, further comprising determining the embedding of the virtual network using a heuristic approach.

In accordance with other aspects of the present disclosure, the system, selecting a most constrained virtual link from a set of unmapped virtual links and the plurality of virtual links associated with the allowed set of substrate paths, wherein the most constrained virtual link is in terms of end-to end path latency as well as in terms of in terms of availability of frequency slots, computing an optimal solution for the one of the plurality of substrate paths connecting the source substrate node and the destination substrate node based on the selected most constrained virtual link, the allowed set of substrate paths, and a set of admissible transmission configurations t, allocating frequency slots to the plurality of substrate links associated with the one of the plurality of substrate paths.

BRIEF DESCRIPTION OF THE FIGURES

The features and advantages of the present disclosure will become apparent from the following detailed description, taken in combination with the appended drawings, in which.

Figure 1:
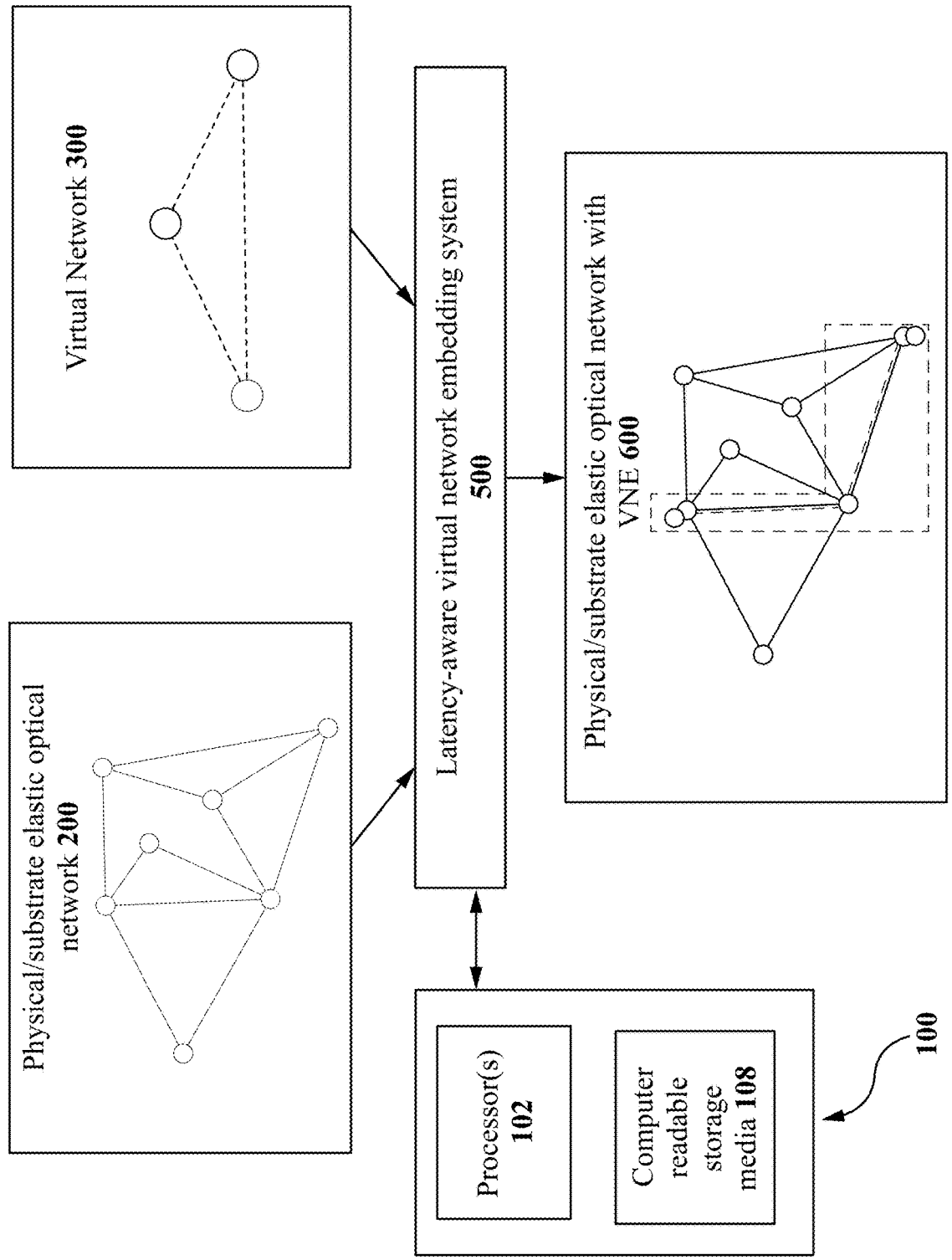
FIG. 1 depicts a high-level block functional block diagram of a system configured to implement latency-aware virtual network embedding over elastic optical networks, in accordance with various embodiments of present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Unless otherwise defined, all technical and scientific terms used herein have the same meaning as commonly understood by one of ordinary skill in the art to which the described embodiments appertain.

FIG. 1 is a high-level block functional block diagram of a system 100 that can be configured to implement various embodiments of latency-aware virtual network embedding. As shown, a latency-aware virtual network embedding system 500 may be configured to receive a virtual network request associated with a virtual network 300 to be embedded on a physical/substrate elastic optical network 200. In accordance with a network topology for the virtual network 200 defined in the received request, and latency requirements for the links within VN 200, and the resources available in physical substrate elastic optical network 200, the latency-aware virtual network embedding system 500 controls or instructs the virtual network embedding (VNE). Latency-aware virtual network embedding system 500 can direct instantiation of virtual nodes and links within physical/substrate elastic optical network 200 to create VNE 600. It is to be noted that physical/substrate elastic optical network 200 and the physical/substrate elastic optical network with VNE 600 may be the same network; however the latter is merely illustrated with VNE. It will be appreciated that in certain embodiments, the latency-aware virtual network embedding system 500 may be implemented on the system 100 as software constructs with programming instructions stored in associated memories and implemented by the associated processors.

The system 100 may comprise one or more computing devices, represented as a single server 100. Although represented as a single server, the system 100 may be implemented as one or more real or virtual servers. As shown the system 100 may be configured to receive a virtual network 300 to be implemented on a physical/substrate elastic optical network 200.

Figure 2:
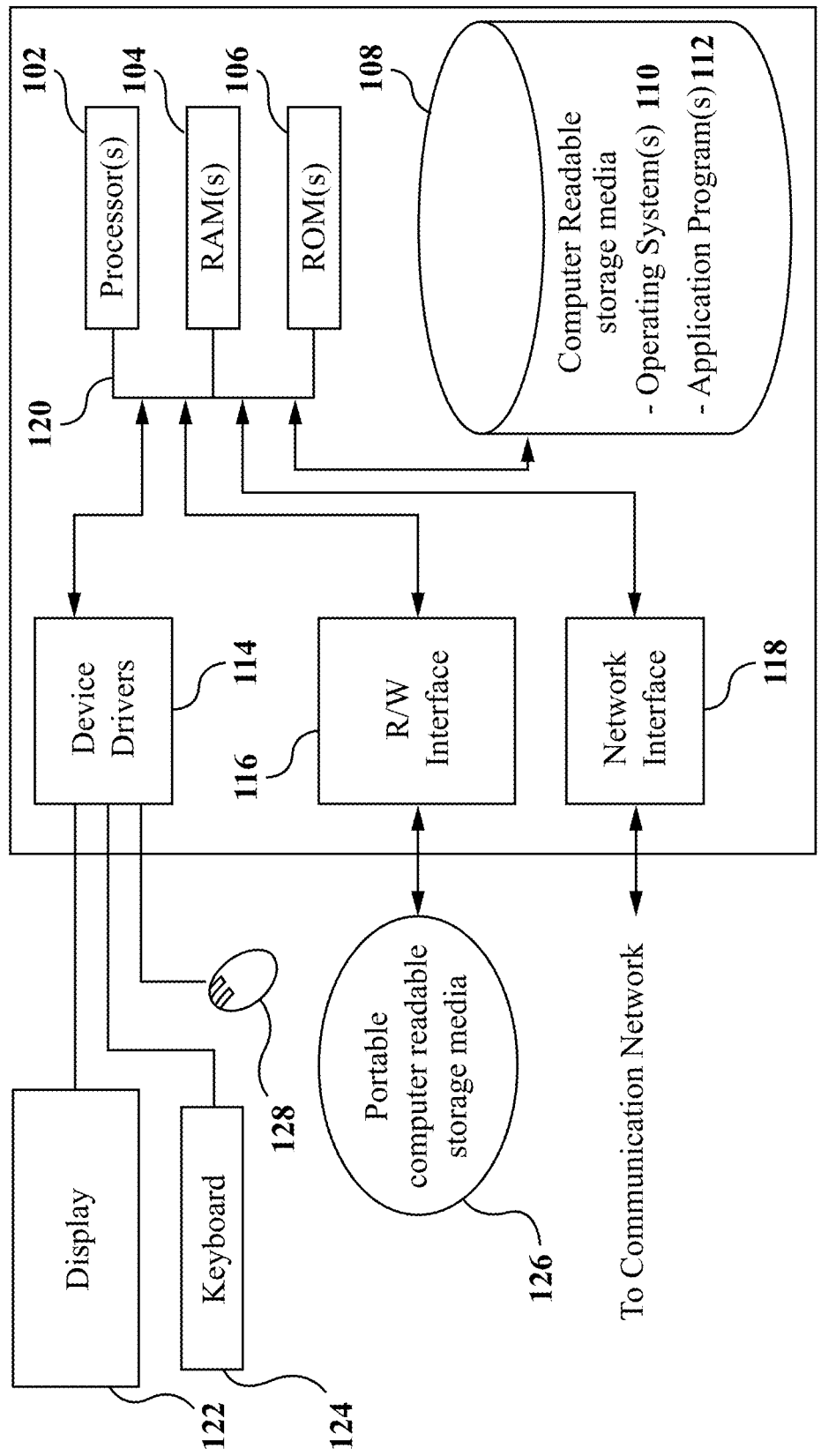
FIG. 2 depicts a high-level block diagram of representative components for the system configured to implement latency-aware virtual network embedding, in accordance with various embodiments of the present disclosure.

FIG. 2 is a high-level block diagram of representative components for the system 100 configured to implement latency-aware virtual network embedding, in accordance with various embodiments of the present disclosure. It should be appreciated that FIG. 2 provides only an illustration of one implementation of the system 100 and does not imply any limitations with regard to the environments in which different embodiments may be implemented. Many modifications to the depicted environment can be done to implement the system 100 without departing from the principles presented herein.

As shown, the illustrative system 100 employs one or more processors 102, one or more computer-readable random access memories (RAMs) 104, one or more computer-readable read only memories (ROMs) 106, one or more computer readable storage media 108, device drivers 114, a read/write (R/W) interface 116, a network interface 118, all interconnected over a communications fabric 120. The communications fabric 120 may be implemented with any architecture designed for passing data and/or control information between processors (such as microprocessors, communications and network processors, etc.), memory, peripheral devices, and any other hardware components within a system.

The one or more operating system(s) 110 and the one or more application program(s) 112 are stored on one or more of the computer readable storage media 108 for execution by the one or more of the processors 102 via the one or more of the respective RAMs 104 (which typically include a cache memory). In the illustrated embodiment, each of the computer readable storage media 108 may be one or more of a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The system 100 may also include a read/write (R/W) interface 116 to read from and write to one or more portable computer readable storage media 126. Application programs 112 on said devices may be stored on one or more of the portable computer readable storage media 126, read via the respective R/W interface 116 and loaded into the respective computer readable storage media 108.

It will be appreciated that in certain embodiments the application programs 112 stored on one or more of the portable computer readable storage media 126 may configure the system 100 to provide latency aware VNE functionality. Broadly, the VNE functionality may receive a virtual network 300 (discussed below) and determine various possibilities to map the virtual network 300 (discussed below) to a physical/substrate elastic optical network (SN) 200 (discussed below). Once an optimal solution to map the virtual network 300 (discussed below) is determined, the mapping may be embedded on the SN 200 (discussed below) to implement the virtual network 300 (discussed below).

The application programs 112 on the system 100 may be downloaded to the system 100 from an external computer or external storage device via a communication network (for example, the Internet, a local area network or other wide area network or wireless network) and network interface 118. From the network interface 118, the programs may be loaded onto computer readable storage media 108.

The system 100 may also include any one or more of an optional display screen 122, a keyboard or keypad 124, and a computer mouse or touchpad 128. The Device drivers 114 may interface to display screen 122 for imaging, to keyboard or keypad 124, to computer mouse or touchpad 128, and/or to display screen 122 (in case of touch screen display) for pressure sensing of alphanumeric character entry and user selections. The device drivers 114, R/W interface 116 and network interface 118 may comprise hardware and software (stored on computer readable storage media 108 and/or ROM 106).

The programs described herein are identified based upon the application for which they are implemented in a particular embodiment of the present disclosure. However, it should be appreciated that any particular program nomenclature herein is used merely for convenience, and thus the disclosure should not be limited to use solely in any specific application identified and/or implied by such nomenclature.

It will be appreciated that the system 100 may be a server, a desktop computer, a laptop computer, a tablet, a smartphone, a personal digital assistant or any device that may be configured to implement the present technology, as should be understood by a person skilled in the art.

Figure 3:
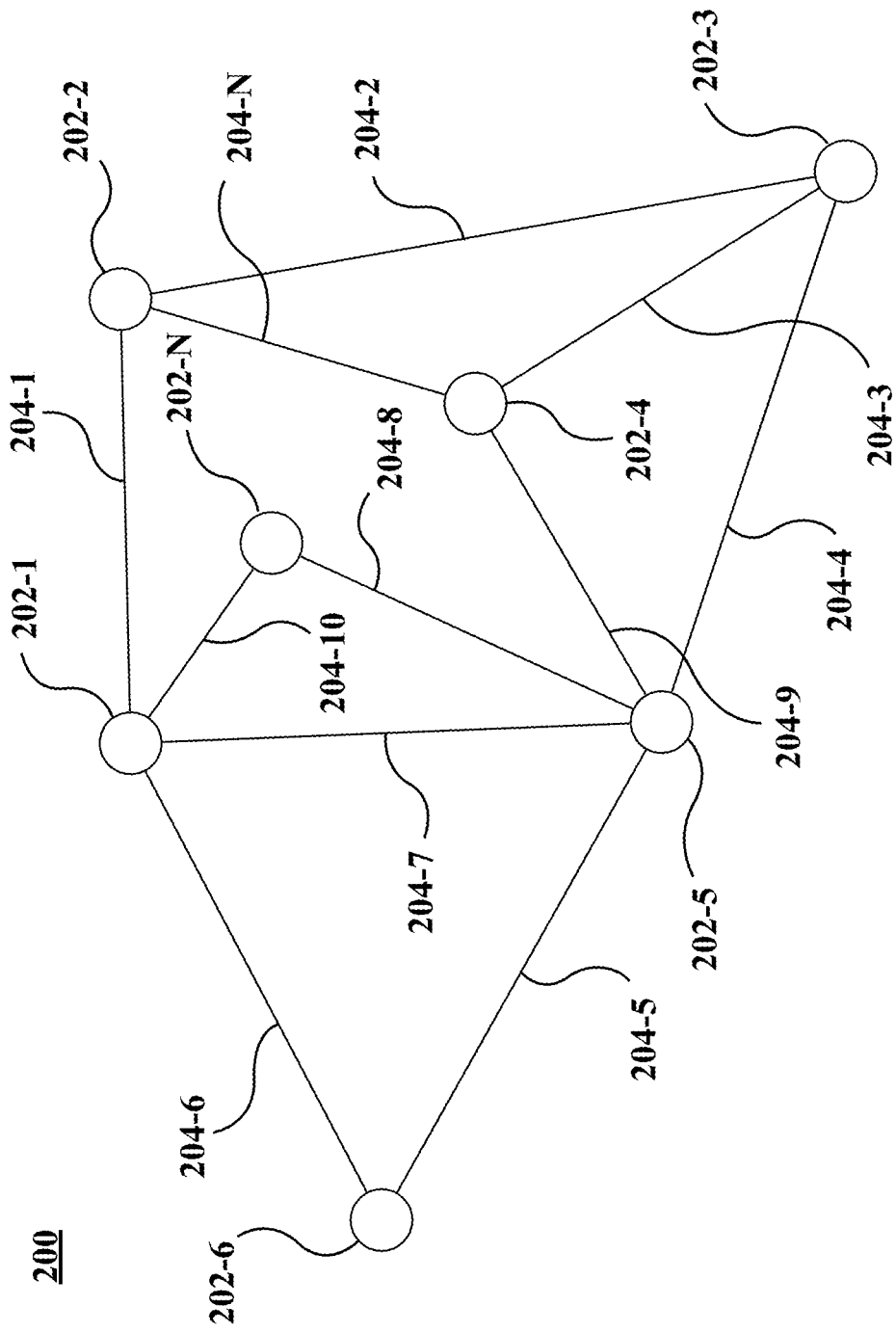
FIG. 3 illustrates a representative example of a physical/substrate elastic optical network (SN), in accordance with various aspects of present disclosure.

FIG. 3 illustrates a representative example of the SN 200, in accordance with various aspects of present disclosure. It is to be noted that in certain embodiments, the SN 200 may be a undirected graph G=(V,E), where V is the set of substrate optical nodes (SNodes) 202-1, 202-2 . . . 202-N and E is the set of substrate optical links (SLinks) 204-1, 204-2 . . . 204-N. Without loss of generality, it has been assumed the set of SNodes 202-1, 202-2 . . . 202-N are colorless, directionless, and contentionless. Further, the set of SLinks 204-1, 204-2 . . . 204-N may be bi-directional, i.e., adjacent SNodes (e.g. SNodes 202-1 and 202-2) may be connected by one optical fiber in each direction (not shown).

SN 200 is an elastic optical network (EON) and as such, the usable optical spectrum on each SLink $e=(u,v) \in E$ may be divided into equal-width frequency slots represented by the set S and enumerated as 1, 2 . . . |S|, where u and v are two SNodes (e.g. SNodes 202-1 and 202-2) connected by a SLink (e.g. SLink 204-1). Each of the SLinks has an associated bandwidth capacity. The bandwidth capacity of a given SLink differ from the bandwidth capacity of another Slink. In addition to the bandwidth capacity, each link also has an associated cost for providing a unit of bandwidth.

Further, and P represents a set of all possible paths in the undirected graph G=(V,E). $P_{uv}^{k} \subset P$ is a subset of P and represents the set of k-shortest paths between SNodes u, v E V, respectively. The two endpoints of a lightpath p E P are typically referred to as the source and the destination. The source is denoted as src(p) and the destination as dst(p). The number of SLinks in the lightpath is represented as |p|. The physical length of the lightpath p in kilometers is denoted as len(p). For example, in FIG. 3, SNodes 202-1 and 202-3 may be treated as endpoints of the lightpath p∈P with two SLinks 204-4 and 204-7 in lightpath p∈P. Also a binary variable $\delta_{pe}$ may denote the association between a lightpath p∈$\mathcal{P}$ and any link e∈E.

In certain embodiments, in order to enable data transmissions with different data rates d∈D, the system 100 can configure the transmission parameters on the path p with physical length len(p). Such transmission parameters may include any one or more of baud-rate or symbol rate b, modulation format m (e.g. QPSK, 16 QAM, 32 QAM etc.), forward error correction code (FEC) overhead, f selected from a set of possible values of baud-rates or symbol rates B, modulation formats M and FEC overheads F. Those skilled in the art will appreciate that as there are a finite number of parameters, and each parameter has a finite number of possible values in a given system, the overall number of possible configurations can be considered to define a space T represented in the above example by a tuple (D, B, M, F). The selected tuple may be represented by t=(d, b, m, f)∈T=(D, B, M, F) where each of d, b, m, and f, are selected from the possible configuration values of D, B, M, F respectively. Further, it should be understood that in some embodiments, the data rate d may be a function of the other parameters. For the sake of representation $t^{(d)}$ $t^{(d)}$, $t^{(b)}$, $t^{(m)}$ and $t^{(f)}$ may be used to denote the data-rate, baud-rate, modulation format, and FEC overhead of a configuration t∈T.

In certain embodiments, based on physical layer characteristics, the system 100 may also compute, or otherwise obtain, a reach table R. The reach table can be used to determine, through a lookup operation, the maximum length of the lightpath p (i.e., the reach $r_t$) capable of retaining a satisfactory optical signal to noise ratio (SNR) when configured according to a transmission configuration t∈T. Finally, $n_t$ denotes the number of frequency slots required to accommodate a transmission configuration t∈T, which may depend on the parameters of t. Table 1 depicts a representative example of the reach table R, in accordance with various aspects of present disclosure.

TABLE 1

| Data Rates D (Gbps) | Modulation Formats M | FEC Overheads F (%) | Spectral Bandwidth (GHz) | Reach $r_t$ (KM) |
|---|---|---|---|---|
| 100 | QPSK | 25% | 50 | 2000 |
|  | 16QAM | 20% | 25 | 1250 |

-continued
TABLE 1

| Data Rates D (Gbps) | Modulation Formats M | FEC Overheads F (%) | Spectral Bandwidth (GHz) | Reach $r_t$ (KM) |
|---|---|---|---|---|
| 200 | QPSK | 25% | 75 | 1000 |
|  | 32QAM | 20% | 37.5 | 400 |

Figure 4:
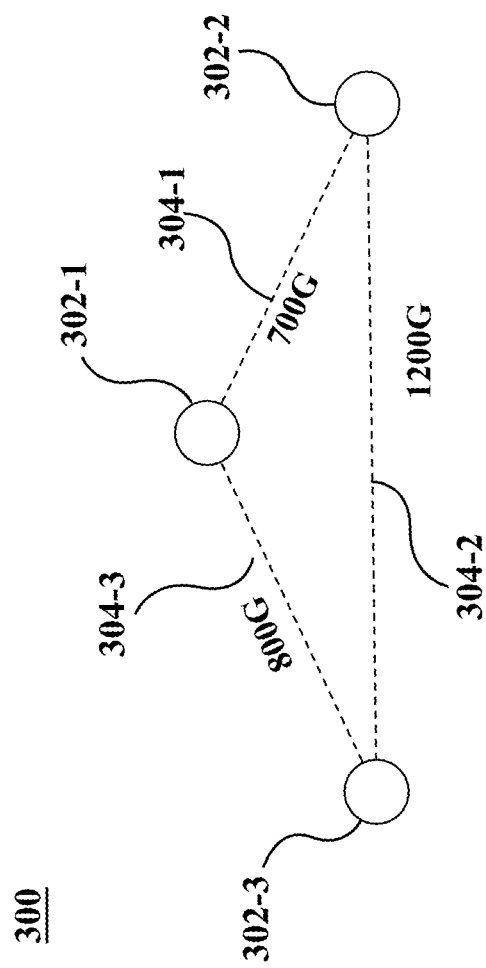
FIG. 4 illustrates a representative example of a virtual network, in accordance with various aspects of present disclosure.

FIG. 4 illustrates a representative example of a virtual network 300, in accordance with various aspects of present disclosure. It is to be noted that in certain embodiments, the virtual network request may include an undirected graph $\overline{G}=(\overline{V}, \overline{E})$, where $\overline{V}$ and $\overline{E}$ are a set of virtual nodes (VNodes) 302-1, 302-2, and 302-3 and a set of virtual links (VLinks) 304-1, 304-2 and 304-3 respectively.

As an example, request for the creation of virtual network 300 may describe the topology and constraints of the virtual network to be embedded onto the SN 200. As depicted, the virtual network 300 comprises three VNodes 302-1, 302-2, and 302-3 connected by Vlinks 304-1, 304-2, and 304-3 each having a different respective bandwidth requirement represented as $\overline{\beta}_{\overline{e}}$. For example, bandwidth requirement associated with the VLinks 304-1, 304-2, and 304-3 are 700 Gbps, 1200 Gbps, and 800 Gbps respectively. The request for virtual network 300 may include additional information associated with the location constraint set $C(\overline{u})$ for each of the VNodes 302-1, 302-2, and 302-3. For example, the location constraint set $C(\overline{u})$ for VNodes 302-1 may be {202-1, 202-2, 202-6}, indicating that VNodes 302-1 must be provisioned on one of the SNodes {202-1, 202-2, 202-6}. Similarly, the location constraint set $C(\overline{u})$ for VNodes 302-2 may be {202-2, 202-3, 202-4}, indicating that VNodes 302-2 must be provisioned on one of the SNodes {202-2, 202-3, 202-4} and the location constraint set $C(\overline{u})$ for VNodes 302-3 may be {202-4, 202-5, 202-6}, indicating that VNodes 302-3 must be provisioned on one of the SNodes {202-4, 202-5, 202-6}.

In certain embodiments, each VNode $\overline{u} \in \overline{V}$ may be associated with a location constraint set $C(\overline{u}) \subset V$ indicating the set of SNodes where $\overline{u}$ can be embedded. The system 100 may set a binary input variable $c_{\overline{u}, u}$ to 1 if $u \in V$ is in the location constraint set $C(\overline{u})$, or to 0 otherwise. The endpoints of the VLink $\overline{e}=(\overline{u}, \overline{v}) \in \overline{E}$ may be denoted by $src(\overline{e})$ and $dst(\overline{e})$, where $\overline{u}$ and $\overline{v}$ may be two VNodes (e.g. VNodes 302-1 and 302-3) connected by a VLinks (e.g. VLinks 304-1 and 304-2). Each VLink $\overline{e} \in \overline{E}$ has a respective bandwidth requirement $\overline{\beta}_{\overline{e}}$. In certain embodiments, the system 100 may allow the Vlinks (e.g. VLinks 304-1 and 304-2) to be mapped to multiple substrate optical paths (SPaths) consisting of a plurality of Slinks (e.g. SLink 204-1, 204-2 etc.), each with a lower data-rate than $\overline{\beta}_e$. Mapping Vlinks (e.g. VLinks 304-1 and 304-2) to multiple SPaths may allow the system 100 to overcome the problem of reach $r_t$ becoming smaller for higher data-rates (as depicted by Table 1) which can act to limit the number of usable SPaths.

The system 100 may put a limit on the number of VLink splits to a value $q \geq 1$. It is understood by a person skilled in the art that, such multi-path provisioning may be achieved by already known techniques such as virtual concatenation (VCAT) in Optical Transport Network (OTN) or bonding capabilities of FlexE.

Figure 5:
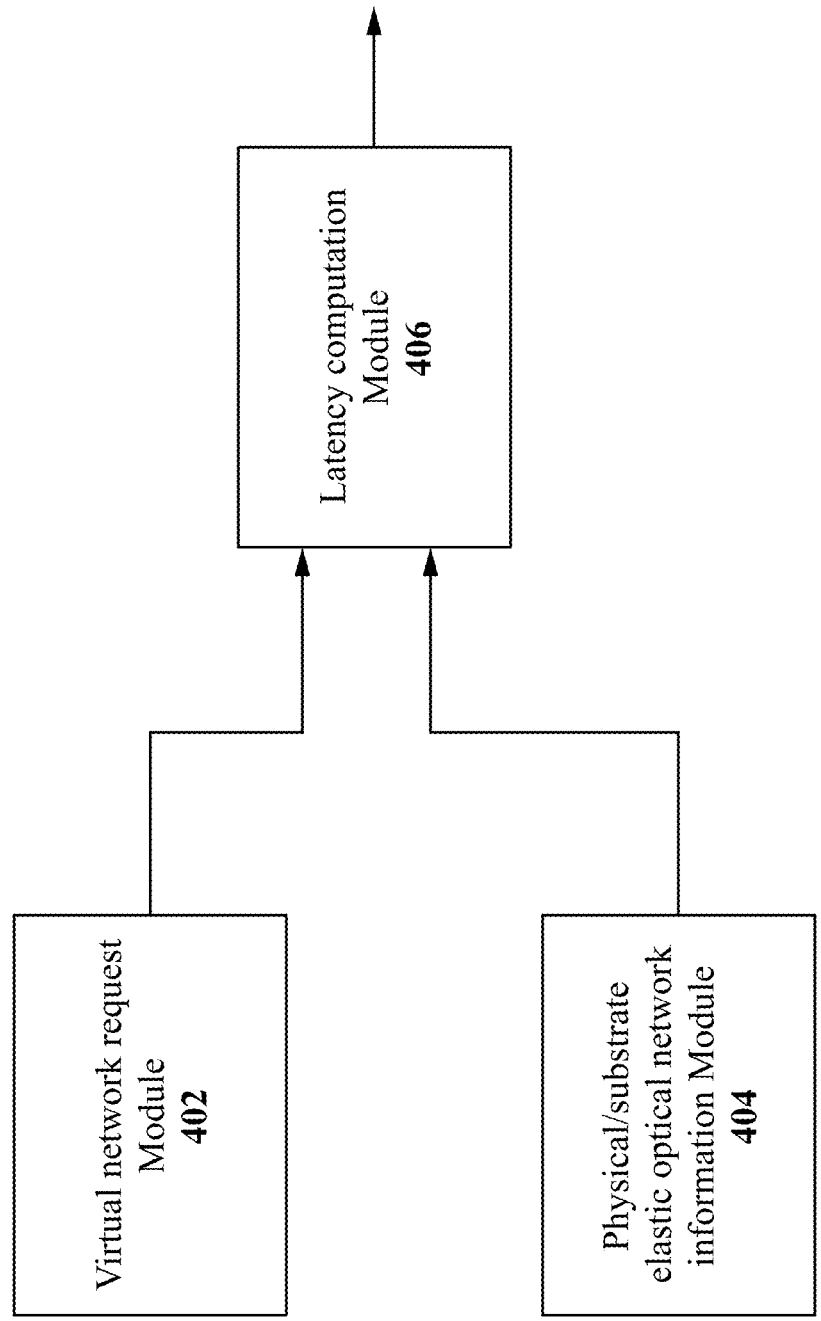
FIG. 5 illustrates a high-level functional block diagram of a system, configured to compute path based latency, in accordance with various aspects of present disclosure.

FIG. 5 illustrates a high-level functional block diagram of a system 400, configured to compute path based latency, in accordance with various aspects of present disclosure. As shown, the system 400 comprises of a virtual network request module 402, a physical/substrate elastic optical network information module 404 and a latency computation module 406. It is to be noted that other elements may be present, but are not illustrated for the purpose of tractability and simplicity.

The virtual network request module 402 may receive a request for a virtual network (e.g. virtual network 300). As noted above, such a request may contain a virtual network topology and virtual network constraints associated with the virtual network. The virtual network topology may comprise VNodes (e.g. VNodes 302-1, 302-2, and 302-3), VLinks (e.g. VLinks 304-1 and 304-1), a demand bandwidth associated with each of the Vlinks and latency constraint set $\mathcal{L}(\overline{G})$. The latency constraints define an acceptable latency for networking paths and not just specific individual links. The virtual network request module 402 may extract information associated with the virtual network (e.g. virtual network 300) and forward the information to the latency computation module 406. Such information includes various location constraints (e.g. location constraint set $C(\overline{u})$) and the demand bandwidth associated with each VLink. The physical/substrate elastic optical network information module 404 provides the latency computation module 406 with information associated with a physical/substrate elastic optical network (e.g. SN 200). It will be understood that that latency computation module 400 may receive the information from module 404 in response to an explicit request for such information, or it may be provided along with the request information from module 402. Such information includes bandwidth capacity per link, length of a link, etc.

Based on received information, the latency computation module 406, computes end-to-end latencies associated with various possible SPaths connecting a source virtual node (e.g VNode 302-1) and a destination virtual node (e.g. VNode 302-1). As an example, let a be a loop-free path (e.g VPath between VNodes 302-1 and 302-3 including Vlinks 304-1 and 304-2) in the virtual network (e.g. virtual network 300). As such, a VPath can have more than one Vlink, therefore $|\overline{a}| \geq 1$. The end-to-end latency budget for the VPath may be represented using a tuple $\ell\,e=(\overline{a}, L) \in (P_{\overline{G}} \times \mathbb{R}^+)$ where L is the latency budget constraint of the VPath, $P_{\overline{G}}$ is the set of all paths in $\overline{G}$ that require a bounded latency as mandated by a service provider and $\mathbb{R}^+$ represents the set of all positive real numbers. The tuple $\ell$ indicates a requirement that after the embedding the virtual network (e.g. virtual network 300) to the physical/substrate elastic optical network (e.g. SN 200), the end-to-end latency of the VPath $\overline{a}$ represented as $\ell^{\overline{a}}$ should not exceed maximum allowable end-to-end latency $\ell^L$. In this case, latency $(\ell^{\overline{a}}) \leq \ell^L$, where latency $(\ell^{\overline{a}}) = \Sigma_{\overline{e} \in \overline{a}}$ latency $(\overline{e})$ is the latency of the VLink $\overline{e}$. All the end-to-end latency constraints of the virtual network (e.g. virtual network 300) request may be represented by a latency constraint set $\mathcal{L}(\overline{G})$. The latency computation module 406 may supply the latency constraint set $\mathcal{L}(\overline{G})$ received as a part of virtual network request to a latency-aware virtual network embedding system 500 (discussed below).

In order to compute end-to-end latency for a path (e.g. end-to-end latency $\ell^{\overline{a}}$), the latency computation module 406 considers various factors contributing to latency on that path. Such factors include latency contributors at a SNode (e.g. SNode 202-1), latency contributors on the lightpath p and differential delay requirements when the traffic is split between to substrate paths between the source and destination node.

In certain embodiments, a SNode (e.g. SNode 202-1) may be a multi-layer flexible node architecture that consists of various components, such as a set of Optical Transport Network/Flexible Ethernet (OTN/FlexE) line-cards (with or without a Forward Error Correction (FEC) encoder/decoder module) (not shown), a set of bandwidth-variable transponders (BVTs) (not shown), and a reconfigurable optical add-drop multiplexer (ROADM) (not shown).

OTN is a deterministic transport technology that eliminates queuing delay due to congestion at the SNode. A FlexE based SNode can be scheduled with static resource allocation, thereby avoiding any congestion altogether. As such, latency incurred by OTN/FlexE SNode can be ignored for the purpose of simplicity. However, in certain embodiments, latency incurred by OTN/FlexE SNode may be considered for overall by OTN/FlexE SNode.

The latency incurred on the set of BVTs (not shown) may vary, depending on their design and supported functionalities. The set of BVTs may be associated with a source SNode (e.g. SNode 202-1) and a destination SNode (e.g. SNode 202-3). More complex the set of BVTs (not shown) include functionality such as in-band management and can have latencies in the range 5-10 μs. However, certain simple and low-cost set of BVTs (not shown) without features such as in-band management may result in set of BVTs processing time $L_{txp}$ as low as 30 ns.

In certain embodiments, a pair of FEC encoder/decoder modules (not shown) may be used within the BVTs for detecting and correcting transmission errors due to noise and other impairments that may present in high-capacity transmissions. A stronger FEC may increase a system margin for a given Bit Error Rate (BER) and optical signal power, thereby increasing the signal-to-noise ratio (SNR), enabling longer optical reaches. The pair FEC encoder/decoder modules (not shown) in the SNode (e.g. SNode 202-1) may introduce a processing delay $L_{fec}$ of ≈10 μs each for standard FECs. However, in certain embodiments processing delay $L_{fec}$ for super FECs with increased correction ability can go up to 150 vs.

Given that the set of BVTs (not shown) and the pair of FEC encoder/decoder modules (not shown) may be involved in a transmission, the overall delay introduced at the terminal SNode (e.g. SNode 202-1) of the lightpath p, irrespective of type of BVTs and FECs, may be represented as $$L_n = 2(L_{txp} + L_{fec}) \quad (1)$$

It is to be noted that the lightpath p goes through all these components only at the source and destination SNodes (e.g. SNodes 202-1 and 202-3 respectively). At intermediate SNodes (e.g. SNode 204-5), also referred to as a bypass node, the lightpath p only passes through ROADMs bypassing OTN/FlexE elements, BVTs and FEC encoder/decoder modules. Therefore, for such bypass nodes, the transmission lightpath p may not encounter latencies due to OTN/FlexE elements, BVTs and FEC encoder/decoder modules of bypass nodes.

With this said, the lightpath p can span several optical links through several bypass SNodes (e.g. SNode 202-N). Depending on the path's length and the network topology, the lightpath p may contain amplifiers, ROADMs and bandwidth-variable optical cross-connect (BV-OXCs) placed along the lightpath p, each contributing towards latency. Other components contributing to latency in the lightpath p may include one or both of re-generators and dispersion compensating fibers (DCF). However, for the sake of simplicity contributions by re-generators and DCFs may be ignored.

The major contributor to the overall latency on the lightpath p may be the propagation delay, $L_{prop}$, within an optical link. This can be generalized to a delay of ≈4.9 μs per kilometer of fiber. Further, the amplifiers in the lightpath p may be required to boost the signal strength on long transmission lines. Usually, erbium doped fiber amplifiers (EDFAs) are widely used in long-haul networks and each EDGA may introduce a delay, $L_{amp}$, of ≈150 ns. The number of amplifiers on lightpath p, may be represented as $n_{amp}(p)$ which may be approximately $\lceil len(p)/f_{span} \rceil$, where len(p) is the physical length of p and $f_{span}$ is the typical distance between two amplifiers, called fiber span (in the order of 80 km).

Another component present along a transparent lightpath is the ROADM, installed on the bypass SNode (e.g. SNode 202-5). ROADMs may also include bandwidth variable optical cross connects (BV-OXC) that can switch the necessary of amount spectrum at bypass SNode (e.g. SNode 202-5). Because optical flows can be independently switched by these intermediate devices for different lightpaths, the latency introduced by ROADMs and BV-OXCs, $L_{roadm}$, may be on the order of tens of ns. The total number of ROADMs (or, BV-OXCs) on the lightpath p is (|p|+1), where |p| is the number of SLinks on the lightpath p.

Based on the above discussion the latency incurred on the end-to-end lightpath may be expressed as follows:

$$L_p = L_n + len(p)L_{prop} + n_{amp}(p)L_{amp} + (|p|+1)L_{roadm} \quad (2)$$

In certain embodiments, VLink embedding may be performed by splitting the demand associated with a single logical channel over multiple SPaths. This results in a VLink's traffic being carried by a set of lightpaths. Each lightpath in this the set of lightpaths supporting the VLink $\bar{e} \in \bar{E}$ may have its own set of physical parameters (e.g. a given lightpath may differ from another lightpaths associated with the VLink in terms of physical length and number of bypass SNodes). These differences in the lightpaths associated with a VLINK can result in different latencies for these lightpaths. Hence, the latency of $\bar{e}$ may be determined by the lightpath p with the maximum $L_p$, as the destination SNode (e.g. SNode 202-3) has to wait for the slowest split before merging traffic from each of the splits of the VLink. The set of paths used for embedding the splits of a VLink $\bar{e} \in \bar{E}$ may be represented as $P_{\bar{e}}$ and the corresponding the latency perceived for the VLink $\bar{e} \in \bar{E}$ may be represented as follows:

$$\text{latency}(\bar{e}) = \max_{p \in P_{\bar{e}}} L_p \quad (3)$$

In certain embodiments, VLink embedding by splitting may impose additional buffering overhead at the destination SNode (e.g. SNode 202-3) to offset the different delays experienced by different splits of the VLink transmitted on different lightpaths. This is also known as the differential delay problem. To account for a differential delay, the destination SNode (e.g. SNode 202-3) may store all but the most delayed flow in a buffer. When the link with the greatest latency delivers packets, the previously delivered packets can be released from the buffer. The amount of buffering required to compensate the differential delay may depend upon both the data-rates of the individual SPaths and the maximum allowed differential delay ($DD_{max}$). The differential delay requirement for a VLink may be expressed in terms of a maximum and a minimum delay of its embedding SPath set as follows:

$$\forall \bar{e} \in \bar{E}: (\max_{p \in P_{\bar{e}}} L_p - \min_{p \in P_{\bar{e}}} L_p) \leq DD_{max} \quad (4)$$

Figure 6:
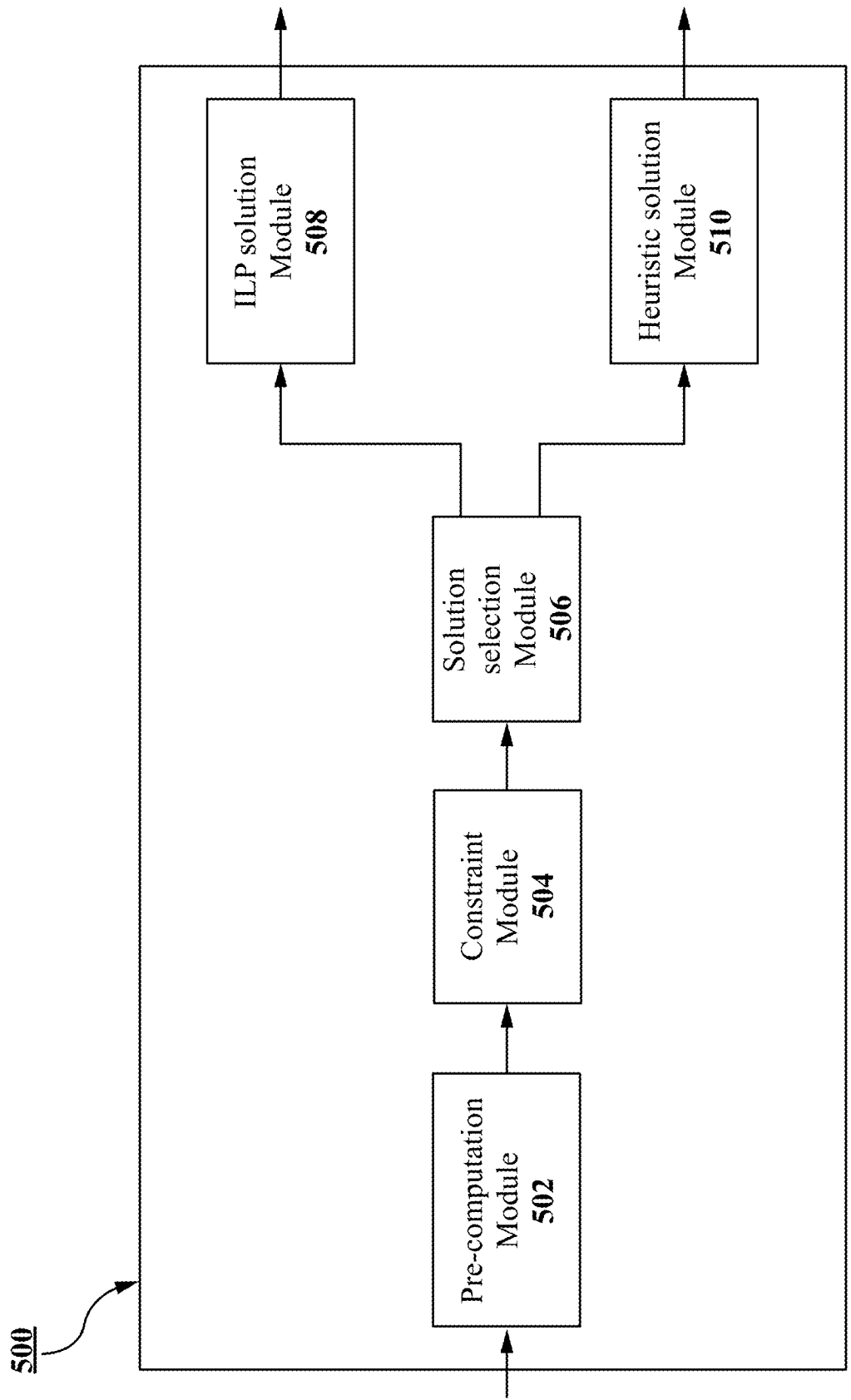
FIG. 6 illustrates a high-level functional block diagram of a latency-aware virtual network embedding system, in accordance with various aspects of present disclosure.

FIG. 6 illustrates a high-level functional block diagram of a latency-aware virtual network embedding system 500, configured to compute an SPath with an assured end-to-end latency as well as minimum number of frequency slots required to embed all VLinks of a virtual network (e.g. virtual network 300), in accordance with various aspects of present disclosure. It should be understood that such a system may be designed to compute optimal SPaths, but this should be understood as a preference.

In certain embodiments, the latency-aware virtual network embedding system 500 may compute end-to-end latency (e.g. end-to-end latency $\ell^{\bar{a}}$) associated with SPaths connecting a source SNode (e.g SNode 202-1) and a destination SNode (e.g. 202-3), wherein the SPaths may contain Slinks (e.g. Slinks 204-1, 204-2, 204-4, 204-7) and SNodes (e.g. SNodes 202-1, 202-2, 202-3, 202-9).

In certain embodiments, the latency-aware virtual network embedding system 500 may embed a VLink (e.g. VLink 304-1) connecting a source VNode (e.g. VNode 302-1) and a destination VNode (e.g. VNode 302-1) onto the one of the SPaths connecting the source SNode (e.g. SNode 202-1) and the destination SNode (e.g. SNode 202-3), wherein the end-to-end latency (e.g. end-to-end latency $\ell^{\bar{a}}$) associated with the one of the SPaths is less than or equal to a maximum allowable end-to-end latency L for the VLink (e.g. VLink 304-1).

As shown, the latency-aware virtual network embedding system 500 employs a pre-computation module 502, a constraint module 504, a solution selection module 506, an integer linear program (ILP) solution module 508, and a heuristic solution module 510. It is to be noted that other elements may be present, but are not illustrated for the purpose of tractability and simplicity.

In certain embodiments, the system 400 may provide the latency-aware virtual network embedding system 500 with various information associated with the undirected graph G=(V,E) (e.g. SN 200), reach table R and the undirected graph $\overline{G}=(\overline{V}, \overline{E})$ (e.g. virtual network 300) with location constraint set $C(\bar{u})$ and latency constraint set $\mathcal{L}(\overline{G})$. For each VLink $\bar{e} \in \overline{E}$, the pre-computation module 502 may compute $P_{\bar{e}}^k$, a set of k paths between each pair of SNodes in the VLink's endpoints' location constraint set $C(\bar{u})$. For each SPath $p \in P_{\bar{e}}^k$, the pre-computation module 502 may compute a set of admissible transmission configurations, $T_{\bar{e}p}$, $\subset T$, such that each configuration $t \in T_{\bar{e}p}$, results in a reach $r_t \geq \text{len}(p)$ and may have a data rate $t^{(d)}$. As such, each one of the VNodes may be mapped to exactly one SNode from its location constraint set $C(\bar{u})$, denoted by the following decision variable:

$$x_{\bar{u}u} = \begin{cases} 1 & \text{if } \bar{u} \in \overline{V} \text{ is mapped to } u \in V \\ 0 & \text{Otherwise} \end{cases}$$

Further, the bandwidth demand associated with the VLink may be satisfied by frequency slots provisioned over multiple SPaths (up to a maximum of q). Frequency slot provisioning over multiple SPaths may be performed using a combination of the following two cases:
i. Allocating contiguous sets of frequency slots on distinct SPaths;
ii. Allocating different contiguous sets of frequency slots on the same SPath (with the same or different transmission configuration(s))

The latter represents a scenario when there are sufficient frequency slots available over an SPath, however, its length does not allow provisioning the required data-rate using a single contiguous set of frequency slots. The pre-computation module 502 may consider that each transmission configuration for the SPath can be instantiated multiple times (up to a maximum of q times). The pre-computation module 502 can considers the following variable to represent VLink mapping:

$$w_{\bar{e}pti} = \begin{cases} 1 & \text{if } \bar{e} \in \overline{E} \text{ uses } i-th \text{ instance of } t \in T_{\bar{e}p} \text{ on} \\ & \text{path } p \in path \ p \in P_{\bar{e}}^k \\ 0 & \text{Otherwise} \end{cases}$$

The pre-computation module 502 also consider the following variable to represent relationship between a mapped SPath and the frequency slots in its SLinks:

$$y_{\bar{e}ptis} = \begin{cases} 1 & \text{if } \bar{e} \in \overline{E} \text{ uses } s \in S \text{ on path } p \in P_{\bar{e}}^k \text{ with} \\ & \text{the } i-th \text{ instance of } t \in T_{\bar{e}p} \\ 0 & \text{Otherwise} \end{cases}$$

The constraint module 504 ensures various constraints have been considered appropriately while mapping the virtual network (e.g. virtual network 300) to the Substrate optical network (e.g. SN 200). Such constraints include VNode mapping constraints, latency constraints, differential delay constraints, VLink demand constraints, frequency slot assignment constraints, and coordination between node and link mapping.

As such, using equations (5) and (6) the constraint module 504 ensures each VNode is mapped to SNode, while satisfying the location constraint. Using equation (7) the constraint module 504 ensures one SNode to host at most one VNode from the same Virtual network.

$$\forall \bar{u} \in \overline{V}, \forall u \in V : x_{\bar{u}u} \leq c_{\bar{u}u} \tag{5}$$

$$\forall \bar{u} \in \overline{V} : \sum_{u \in V} x_{\bar{u}u} = 1 \tag{6}$$

$$\forall u \in V : \sum_{\bar{u} \in \overline{V}} x_{\bar{u}u} \leq 1 \tag{7}$$

In order to satisfy the latency constraint set $\mathcal{L}(\overline{G})$, the constraint module 504 converts the equation (3) to a linear constraint in order to find the latency of each VLink from its sets of embedding paths as following:

$$\forall \bar{e} \in \overline{E}, \forall p \in P_{\bar{e}}^k, \forall t \in T_{\bar{e}p}, 1 \leq i \leq q : L_p w_{\bar{e}pti} \leq \text{vlink\_lat}_{\bar{e}} \tag{8}$$

The following constraint, then uses the equation (8) to ensure that each latency constraint $l \in \mathcal{L}(\overline{G})$ is satisfied:

$$\forall l \in \mathcal{L}(\overline{G}) : \Sigma_{\forall \bar{e} \in l^{(a)}} \text{vlink\_lat}_{\bar{e}} \leq l^{(L)} \tag{9}$$

As previously discussed, VLink embedding must satisfy the differential delay requirement in the equation (4). To this end, the constraint module 504 uses equations (8) and (10) to find the maximum and minimum delay of each VLink, respectively. The value of λ in the equation (10) may be sufficiently larger than the maximum value of $L_p$ to avoid getting zero as the minimum latency of a VLink induced by a non-selected path, tuple, and instance combination.

$$\forall \bar{e} \in \overline{E}, \forall p \in P_{\bar{e}}^k, \forall t \in T_{\bar{e}p}, 1 \leq i \leq q : \text{min\_delay}(\bar{e}) \leq w_{\bar{e}pti} \times L_p + (1 - w_{\bar{e}pti}) \times \lambda \tag{10}$$

For a non-selected path combination, the second term on the R.H.S of the equation (10) becomes dominant, generating the constraint min_delay($\bar{e}$)≤λ. Also for a selected path, tuple, and instance combination, the second term becomes zero and the first term generates the constraint min_delay($\bar{e}$)≤$L_p$. As λ»$L_p$, min_delay($\bar{e}$) $L_p$ dominates over min_delay($\bar{e}$)≤λ to generate the minimum delay of a VLink as the minimum delay of all the selected path, tuple, and instance combinations. Finally, the constraint module 504 uses equations (8) and (10) to enforce the differential delay requirement for VLink as following:

$$\forall \bar{e} \in \bar{E}: \text{vlink\_lat}_{\bar{e}} - \min\_\text{delay}(\bar{e}) DD_{max} \quad (11)$$

The constraint module 504 uses constraint in the equation (12) to ensure that for each VLink $\bar{e} \in \bar{E}$, the sum of data-rates resulting from applying the selected transmission configuration on the selected paths is equal to the VLink's demand. The constraint module 504 can use the equation (13) to enforce an upper limit on the number of splits.

$$\forall \bar{e} \in \bar{E}: \sum_{\forall p \in P_{\bar{e}}^k} \sum_{\forall t \in T_{\bar{e}p}} \sum_{i=1}^q (w_{\bar{e}pti} \times t^{(d)}) = \bar{B}_{\bar{e}} \quad (12)$$

$$\forall \bar{e} \in \bar{E}: \sum_{\forall p \in P_{\bar{e}}^k} \sum_{\forall t \in T_{\bar{e}p}} \sum_{i=1}^q w_{\bar{e}pti} \leq q \quad (13)$$

Regarding frequency slot assignment and spectral contiguity constraints, the constraint module 504, using the equation (14), ensures that if a path p is selected with a specific transmission configuration t, then the required number of frequency slots $n_t$ to support the data-rate $t^{(d)}$ is allocated on the path p. Using the equation (15), the constraint module 504 ensures that each frequency slot on an SLink is allocated to at most one substrate path. Finally, the constraint module 504 uses equations (16) to ensure the frequency slots allocated on each SLink of the SPath form a contiguous frequency spectrum.

$$\forall \bar{e} \in E, \forall p \in P_{\bar{e}}^k, \forall t \in T_{\bar{e}p}, 1 \leq i \leq q: \sum_{\forall s \in S} y_{\bar{e}ptis} = n_t w_{\bar{e}pti} \quad (14)$$

$$\forall e \in E, \forall s \in S: \sum_{\bar{e} \in E} \sum_{\forall p \in P_{\bar{e}}^k} \sum_{\forall t \in T_{\bar{e}p}} \sum_{i=1}^q w_{\bar{e}pti} y_{\bar{e}ptis} \delta_{pe} \leq 1 \quad (15)$$

$$\forall \bar{e} \in E, \forall p \in P_{\bar{e}}^k, \forall t \in T_{\bar{e}p}, 1 \leq i \leq q,$$

$$1 \leq s \leq |S| - 1: \sum_{s'=s+2}^{|S|} y_{\bar{e}ptis'} \leq |S| \times (1 - y_{\bar{e}ptis} + y_{\bar{e}pti(s+1)}) \quad (16)$$

In order to coordinate between node and link mapping, the constraint module 504, using the equation (17), ensures that two endpoints of a VLink $\bar{e} \in \bar{E}$ are mapped to the source and destination SNodes of an SPath p only when p is used for embedding $\bar{e}$.

$$\forall \bar{e} \in \bar{E}, \forall p \in P_{\bar{e}}^k, \forall t \in T_{\bar{e}p}, 1 \leq i \leq q: x_{src(\bar{e})src(p)} \times x_{dst(\bar{e})dst(p)} \geq w_{\bar{e}pti} \quad (17)$$

Based on inputs from constraint module 504, in certain embodiments, the solution selection module 506 may provide an objective function, as represented by the equation (18) either to the ILP solution module 508 or to the heuristic solution module 510. In certain embodiments, the selection criteria followed by the solution selection module 506 may be based on various factors, such as size of the virtual network to be provisioned, size of physical/substrate elastic optical network, time required to find a solution to embed the virtual network over the physical/substrate elastic optical network.

In certain embodiments, if the ILP solution module 508 is selected to compute an optimal solution for optimal SPath with an assured end-to-end latency as well as minimum number of frequency slots required to embed all VLinks of a virtual network (e.g. virtual network 300), the solution selection module 506 may provide the objective function represented by the equation (18) and all other constrains discussed from equation (5) to equation (17) to the ILP solution module 508. The ILP solution module 508 may perform a search over the space of possible solutions associated with the equation (18). In so doing, the ILP solution module 508 may find a solution that minimizes the total number of frequency slots required to embed all the VLinks of a VN as shown in the first part of equation (18). However, if there are multiple possible solutions, in order to break ties among multiple solutions with the same total number of slots, the solution selection module 506 may use a second term in equation (18) that minimizes the total length of paths being used and a third term in equation (18) that minimizes the number of splits over all the VLinks.

$$\text{minimize} \left( \sum_{\forall \bar{e} \in E} \sum_{\forall p \in P_{\bar{e}}^k} \sum_{\forall t \in T_{\bar{e}p}} \sum_{i=1}^q \sum_{\forall s \in S} y_{\bar{e}ptis} \times |p| + \in_1 \times \right.$$

$$\sum_{\forall \bar{e} \in E} \sum_{\forall p \in P_{\bar{e}}^k} \sum_{\forall t \in T_{\bar{e}p}} \sum_{i=1}^q \sum_{\forall s \in S} y_{\bar{e}ptis} \times len(p) + \in_2 \times$$

$$\left. \sum_{\forall \bar{e} \in E} \sum_{\forall p \in P_{\bar{e}}^k} \sum_{\forall t \in T_{\bar{e}p}} \sum_{i=1}^q w_{\bar{e}pti} \right) \quad (18)$$

Those skilled in the art will appreciate that ILP module 508 may use any number of different techniques to perform its search of the solution space. In some embodiments, an exhaustive search may be employed, while in others possible solutions may be evaluated to find one that satisfies latency and available resource constraints even if not optimal.

The weight $\in_1$ in equation (18) may be chosen in a way that the second term is effective only when multiple optimal solutions have same value using the first term. The weight $\in_2$ in equation (18) may be chosen in a way that the third term is effective only when multiple optimal solutions have same value when both the first and second terms in (18) have been used.

Even though the above discussed functionality of ILP solution module 508 may provide an optimal embedding of the virtual network satisfying end-to-end latency constraint, the real time computational complexity, and the time required to embed such virtual network may be prohibitively high. To address this, a more practical heuristic approach may be used to provide a reasonable solution in a reasonable amount of time. As an example, the heuristic approach described below may provide a sub-optimal embedding in that has an associated cost that may be up to, for e.g. 10%-15% more than the optimal embedding solution obtained through an exhaustive search approach. However the heuristic approach may arrive at the non-optimal solution in near real time. For example, for a large network with around 100 substrate nodes or more, the ILP solution may take up to several hours to compute an optimal embedding, while the heuristic based approach may find an acceptable solution in less than 1 second. The ability to determine near-optimal solutions in near real-time allows for greater flexibility in provisioning networks. For example, virtual networks can be provisioned, tested, changes made to the virtual network, re-provisioned and tested again, all without requiring long wait times to determine possible embeddings for the virtual networks.

Figure 7:
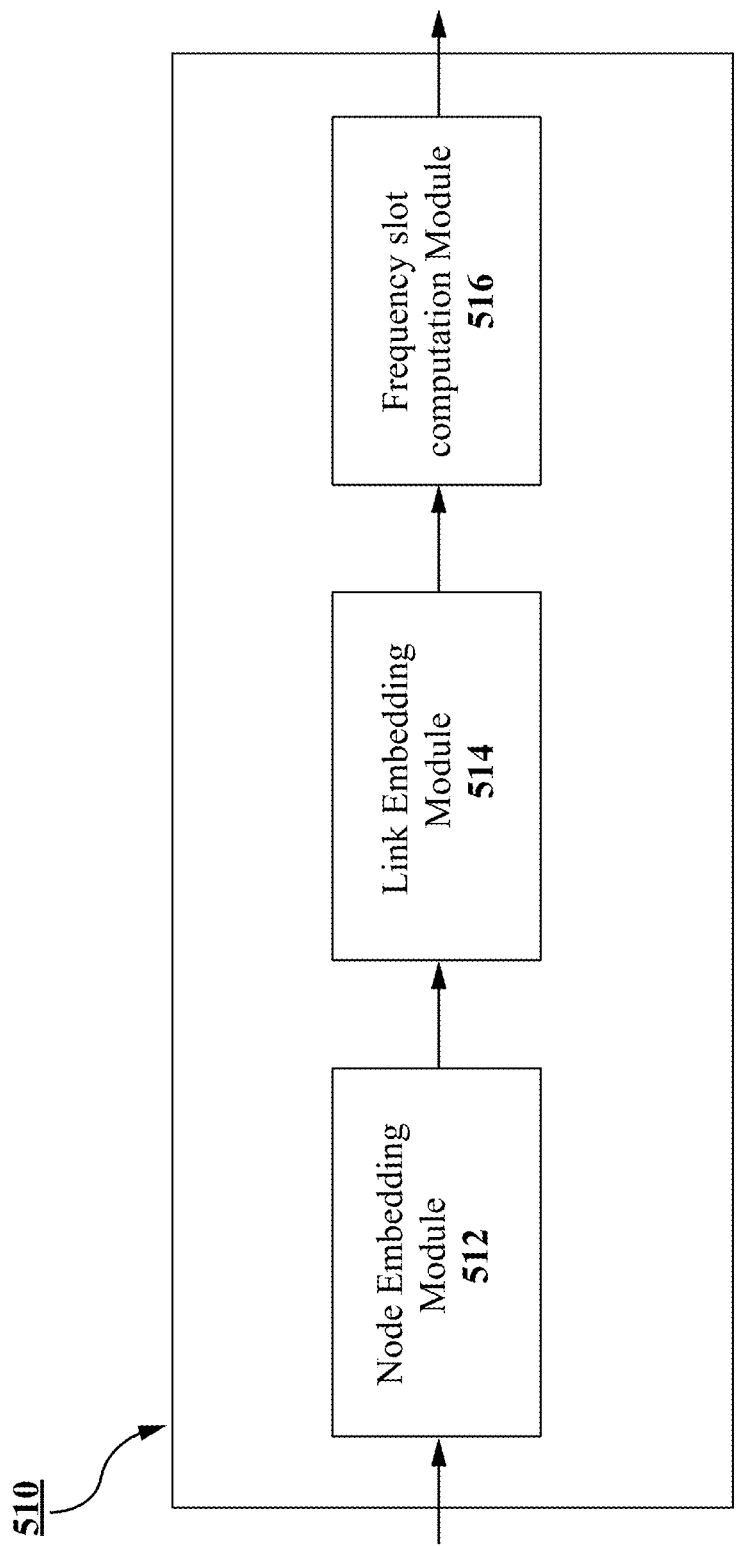
FIG. 7 illustrates a high-level functional block diagram of a heuristic solution module, in accordance with various aspects of present disclosure.

With this said, FIG. 7 illustrates a high-level functional block diagram of heuristic solution module 510, configured to compute a node embedding function, a link embedding function, and total number of frequency slots required to provision a virtual network (e.g. virtual network 300) in accordance with various aspects of present disclosure. As shown, the heuristic solution module 510 employs a node embedding module 512, a link embedding module 514 and a frequency slot computation module 516. It is to be noted that other elements may be present, but are not illustrated for the purpose of tractability and simplicity.

In certain embodiments, if the heuristic solution module 510 is selected to compute an optimal solution for optimal SPath with an assured end-to-end latency as well as minimum number of frequency slots required to embed all VLinks of a virtual network (e.g. virtual network 300), the solution selection module 506 may provide the objective function represented by the equation (18) and all other constrains discussed from equation (5) to equation (17) to the heuristic solution module 510. The node embedding module 512 may compute a node embedding function $\tau$: $\overline{V} \to V$, such that based on the node embedding function r the node embedding module 512 may perform embedding each VNode $\overline{u} \in \overline{V}$ to an SNode $u \in C(\overline{u})$ in accordance with their location constraints.

Further, the link embedding module 514 may compute a link embedding function $\gamma: \overline{E} \to \mathcal{X} : \mathcal{X} \subset P \times T \times S^2$ and $1 \leq |\mathcal{X}| \leq q$. In so doing, the link embedding module 514 computes the link embedding function $\gamma$ for a maximum q splits for the demand bandwidth $\overline{\beta}_{\overline{e}}$ of each VLink $\overline{e} \in \overline{E}$, selects an SPath and an appropriate transmission configuration $t \in T$ from the reach table R for each split, and may allocate a contiguous segment of frequency slots represented by the starting and ending frequency slot index on each SLink along the SPath. $\mathcal{X}_{\overline{e}i} = (p, t, s_b, s_t) | 1 \leq i \leq q$ represents the i-th split, where $\mathcal{X}_{\overline{e}i}^{(p)}$ and $\mathcal{X}_{\overline{e}i}^{(t)}$ denote the selected SPath and transmission configuration for the i-th split, respectively. In addition, allocation of spectrum frequency slots for the i-th split begins at index $\mathcal{X}_{\overline{e}i}^{(s_b)}$ and ends at index $\mathcal{X}_{\overline{e}i}^{(s_t)}$ along each SLink in the SPath $\mathcal{X}_{\overline{e}i}^{(p)}$. The link embedding function $\gamma$ may assist in embedding VLink in such a manner that end-to-end latency constraint on virtual paths may be satisfied, i.e. $\forall l \in \mathcal{L}(\overline{G}): \text{latency}(l^{(\overline{a})}) \leq l^{(L)}$.

To this end, the link embedding module 514 may consider a sequential VLink embedding order that is dynamically computed to converge to a solution within a reasonable time. Further, the link embedding module 514 may estimate an upper bound of the end-to-end latency budget of a VLink $\overline{e}$ based on the end-to-end latencies and frequency slots availability in the SPaths of the other unmapped VLinks. In certain embodiments, the SPaths in $P_{\overline{e}}^k$ may be sorted in increasing order of their length and the upper bound of the end-to-end latency budget may be set to the end-to-end latency of the maximal i-th Spath $p_i \in P_{\overline{e}}^k | i \leq k$, in such a manner that the chosen value satisfies the latency constraint set $\mathcal{L}(\overline{G})$ associated with the VLinks. Therefore, the link embedding module 514 based on the estimated latency end-to end path latency budget may generate an allowed set of candidate SPaths $P_{\overline{e}}^i = \{p_1, p_2, \ldots p_{i'}\}$ for embedding VLink $\overline{e}$.

In order to increase the chances of finding a feasible solution, the link embedding module 514 may embed a most constrained VLink $\overline{e}$ in terms of end-to end path latency as well as in terms of in terms of availability of frequency slots in the allowed set of candidate SPaths $P_{\overline{e}}^i = \{p_1, p_2, \ldots p_{i'}\}$ during each iteration. Further, the link embedding module 514 may find the most constrained VLink $\overline{e}$ from a set of unmapped VLinks and the allowed set of candidate SPaths $P_{\overline{e}}^i = \{p_1, p_2, \ldots p_{i'}\}$ for embedding VLink $\overline{e}$.

The link embedding module 514 may estimate the end-to-end latency budget of the unmapped VLinks in a manner that embedding later in the order may not fail due to very tight budgets or due to insufficient number of contiguous frequency slots in their candidate SPaths $P_{\overline{e}}^i = \{p_1, p_2, \ldots p_{i'}\}$.

In certain embodiments, the link embedding module 514 takes the frequency slot availability in the allowed set of candidate SPaths $P_{\overline{e}}^i = \{p_1, p_2, \ldots p_{i'}\}$ into account while estimating the end-to-end latency budgets. As such, the link embedding module 514 may compute an index $d_{\overline{e}}$ for each VLink $\overline{e}$, the index $d_e$ denotes a maximum index of the SPath in the set of allowed candidate SPaths $P_{\overline{e}}^i = \{p_1, p_2, \ldots p_{i'}\}$ corresponding to the end-to-end latency budget. While computing this index $d_{\overline{e}}$, the link embedding module 514 may employ spectrum awareness by maximizing the minimum number of usable frequency slots in the allowed set of candidate SPaths $P_{\overline{e}}^i = \{p_1, p_2, \ldots p_{i'}\}$ for each of the remaining VLinks while satisfying end-to-end latency constraints. In so doing, the link embedding module 514 may perform binary search over the interval between one and a minimum value of the number of free frequency slots in the allowed set of candidate SPaths $P_{\overline{e}}^i = \{p_1, p_2, \ldots p_{i'}\}$ of remaining Vlinks. As such, in certain embodiments the frequency slots may be allocated in an increasing order of index associated with the frequency slots.

In each iteration of a binary search, the link embedding module 514 may select a median value med in the range and increases the index $d_{\overline{e}}$ until the total number of free frequency slots in the allowed set of candidate SPaths $P_{\overline{e}}^i = \{p_1, p_2, \ldots p_{i'}\}$ becomes equal or more than med. The link embedding module 514 then uses the index $d_{\overline{e}}$ to compute the estimated end-to-end latency VLink $\overline{e}$. After estimating end-to-end latencies for all the unmapped VLinks, the link embedding module 514 checks if any latency constraint in the set latency constraint set $\mathcal{L}(\overline{G})$ is violated. Based on this test, the binary search continues in the appropriate range and terminates when the range size becomes one.

In this manner, the binary search in the link embedding module 514 provides a lower bound on the minimum number of usable frequency slots across all the VLinks. In order to find the most constrained VLink in terms of the number of usable frequency slots, the link embedding module 514 traverses the unmapped VLinks in decreasing order of their associated bandwidth demands. Since multiple VLinks can have the minimum number of usable frequency slots, the associated bandwidth demand may be used as a tie-breaker. For each VLink $\overline{e}$ in the enumerated order, the link embedding module 514 increases the index $d_{\overline{e}}$ computed earlier by binary search and checks if all the end-to-end latency constraints can still be satisfied using an expanded set of allowed SPaths. According to the property of binary search, there exists at least one VLink for which the index $d_{\overline{e}}$ cannot be increased beyond a without violating at least one end-to-end latency constraint.

Considering such VLink as the most constrained VLink, the link embedding module 514 may compute an optimal solution for embedding VLink ē, given the mapped VNodes to the SNodes and the allowed set of candidate SPaths $P_{\bar{e}}^i=\{p_1, p_2, \ldots p_i\}$. The optimal solution for VLink ē consists of a multi-set of SPaths where each SPath in the multi-set has an associated transmission configuration and frequency slot allocation. For each instance of the multi-set of SPaths, the link embedding module 514 checks the feasibility of all possible transmission configurations and provides the multi-set of SPaths to the frequency slot computation module 516.

The frequency slot computation module 516 may compute the total number of frequency slots required to provision the virtual network (e.g. virtual network 300) which is a minimum value according to following cost function:

$$\sum_{\forall \bar{e} \in E} \sum_{i=1}^{q} (\mathcal{X}_{\bar{e}i}^{(s_t)} - \mathcal{X}_{\bar{e}i}^{(s_b)} + 1) \times |\mathcal{X}_{\bar{e}i}^{(p)}| \quad (19)$$

where, $|\mathcal{X}_{\bar{e}i}^{(p)}|$ is the total number of Slinks on the SPath $\mathcal{X}_{\bar{e}i}^{(p)}$.

The functionality of the heuristic solution module 510 may be subject to substrate resource constraints, and spectral contiguity (i.e., the allocated frequency slots of each split are always adjacent to each other) and continuity constraints (i.e., the same sequence of frequency slots are allocated on each SLink along an SPath) on the lightpaths.

Finally, for each pair of a multi-set of SPaths and a corresponding transmission configuration, the frequency slot computation module 516 performs frequency slot allocation over various SPaths in accordance with the most constrained VLink. In certain embodiments, the frequency slot allocation may be performed by techniques known to a person skilled in the art, such techniques may include First-Fit approach In certain embodiments, the heuristic solution module 510 may also receive a priority objective as input, where the priority objective may further define the priority of the manner in which the heuristic solution module 510 provides the optimal solution. The priority objective may be frequency slot minimization, load balancing, and blocking minimization. In any case, the optimal solution primarily follows the criteria of end-to-end latency constraints and the above said objectives are secondary.

With this said, among all the feasible solutions consisting of multi-set of SPaths, an associated transmission configuration, and a spectrum slice allocation if the objective is frequency slot minimization, the heuristic solution module 510 creates an embedding plan for embedding the virtual network (e.g. virtual network 300) that requires the minimum number of frequency slots while the assured end-to-end latency is still being maintained. If the priority objective is load balancing, the heuristic solution module 510 embeds the virtual network (e.g. virtual network 300) that distributes the load at an increased cost of embedding the VLink ē while still maintaining the assured end-to-end latency. If the priority objective is blocking minimization, the heuristic solution module 510 embed the virtual network (e.g. virtual network 300) that again at an additional cost of embedding the VLink ē avoids blocking of a virtual network (e.g. virtual network 300) being embedding on a substrate optical network (e.g. SN 200) while still maintaining the assured end-to-end latency.

It will be appreciated that, although the functionality of various systems, such as systems 400, and 500 have been discussed individually, however these systems may be implemented in conjunction with each other on the system 100 by any one or more of hardware-based, software-based, and firmware-based elements.

Figure 8:
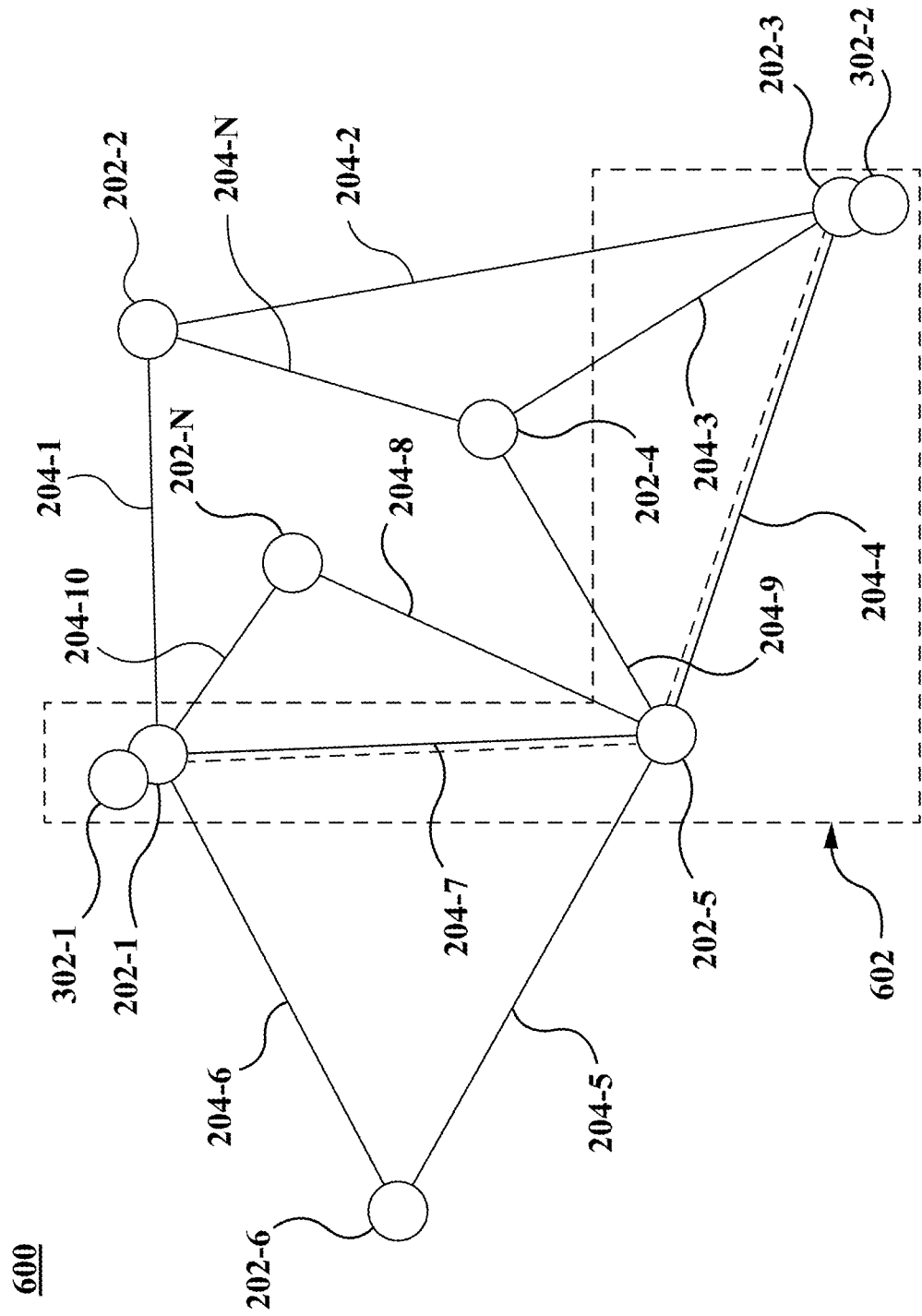
FIG. 8 illustrates a representative example of the SN embedded with the virtual network, in accordance with various aspects of present disclosure.

FIG. 8 illustrates a representative example of the SN 600 embedded with the virtual network 300, in accordance with various aspects of present disclosure. As shown, the VNode 302-1 is embedded to the SNode 202-1 and VNode 302 is embedded to the SNode 202-3. Further, based on the functionality of the latency-aware virtual network embedding system 500 discussed above the optimal SPath may be represented as 602 contains Slinks 204-4 and 204-7.

Figure 9:
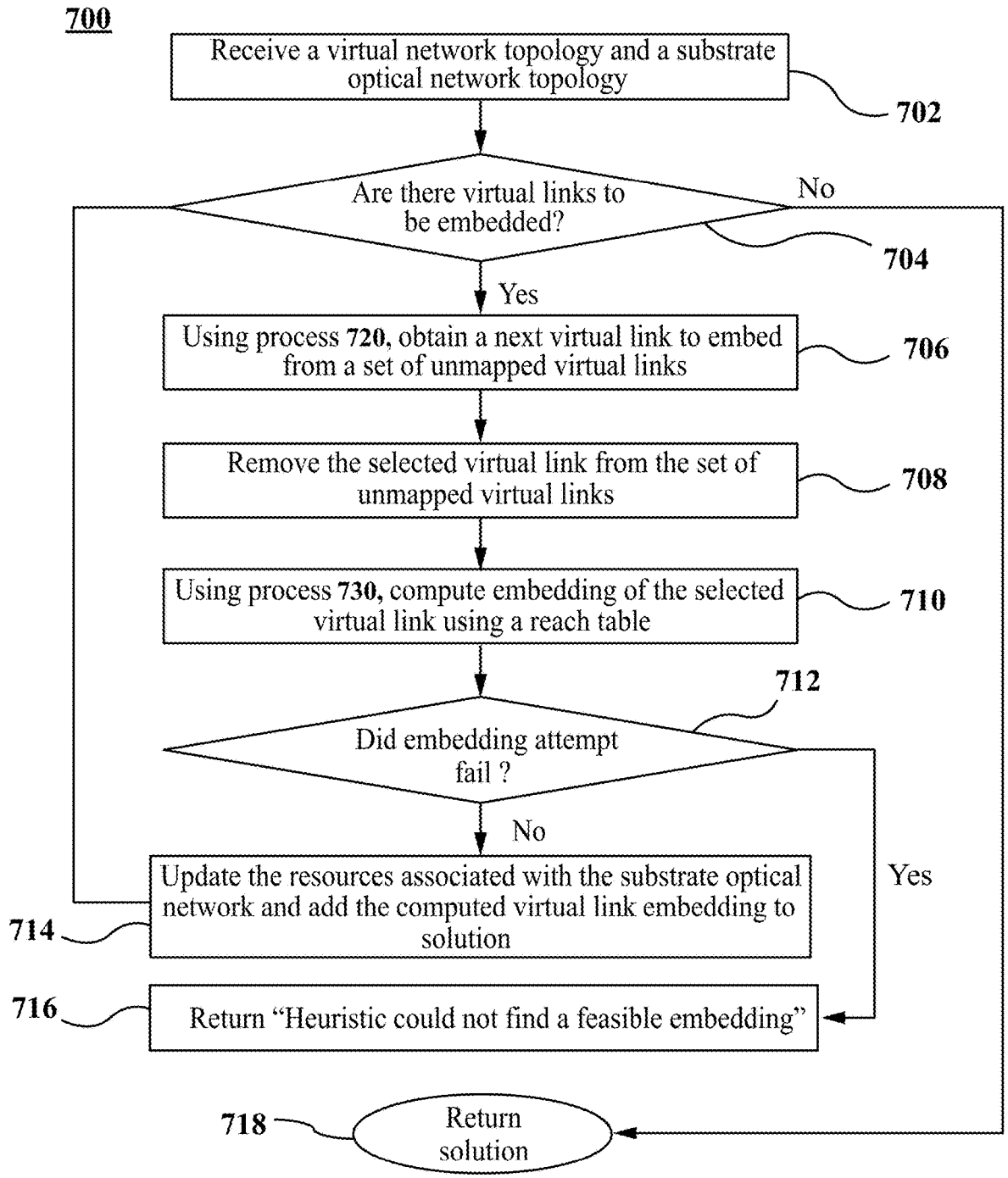
FIGS. 9, 10, and 11 illustrate representative examples of functional flow diagrams of a heuristic process directed to a method for virtual network embedding implemented in the latency-aware virtual network embedding system, in accordance with various embodiments of present disclosure.
Figure 10:
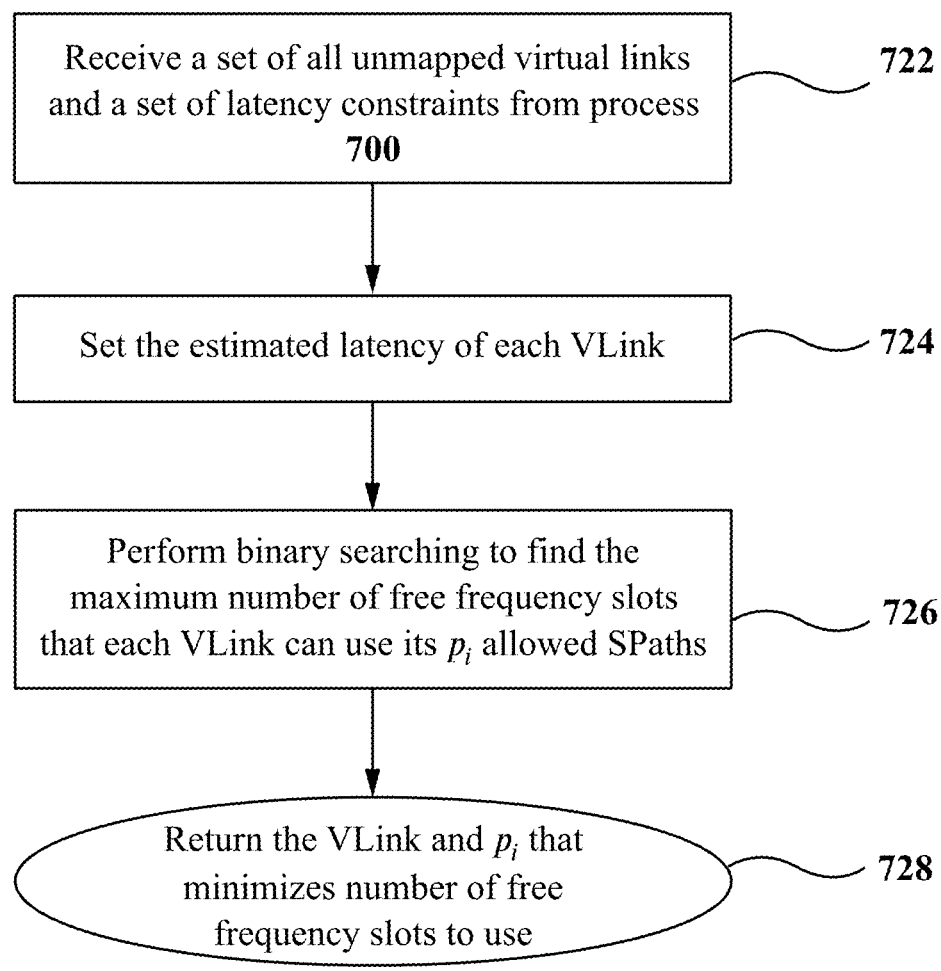
Figure 11:
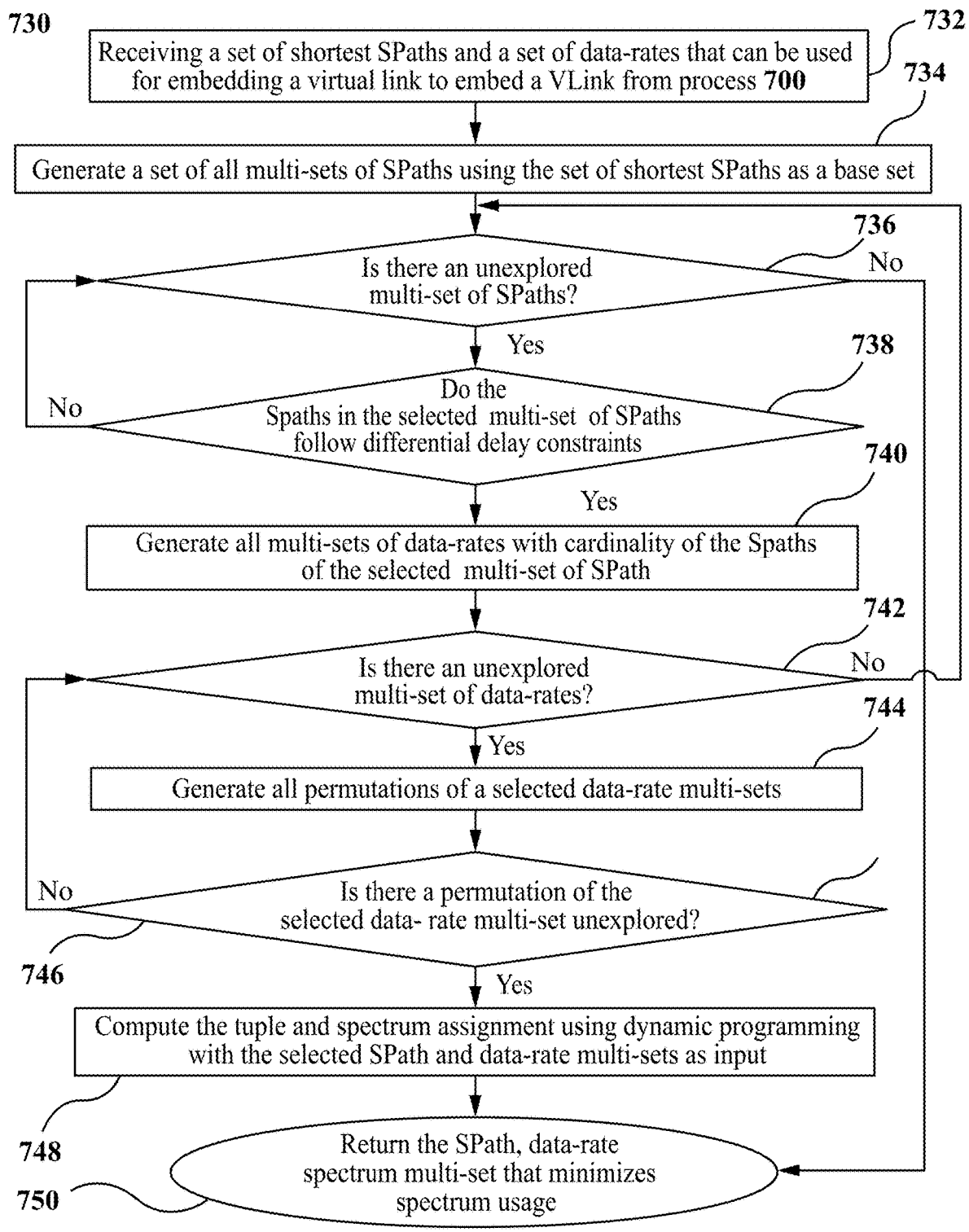

FIGS. 9, 10, and 11 illustrate representative examples of functional flow diagrams 700, 720, and 730 of a heuristic process directed to a method for virtual network embedding implemented in the latency-aware virtual network embedding system 500, in accordance with various embodiments of present disclosure. As shown in FIG. 9, the process 700 commences at task block 702. At task block 702, the process 700 receives information associated with the virtual network topology and the substrate network topology.

The process 700 then advances to task block 704 where the process 700 verifies if there are any VLinks ē∈E, to embed. If there are any VLinks ē∈E, to embed, the process 700 proceeds to task block 706, else the process 700 moves to task block 718. At task block 706, the process 700 passes the control to the process 720 in order to obtain the next most constrained VLink e from a set of unmapped virtual links. As shown in FIG. 10, the process 720 begins at task block 722. At task block 722, the process 720 receives the set of unmapped virtual links and the latency constraint set $\mathcal{L}(\overline{G})$ associated with the set of unmapped virtual links.

The process 720 proceeds to task block 724, where the process 700 computes an estimated latency associated with the set of unmapped virtual links. The estimating of latency is performed using the longest SPath in the k shortest SPaths between each pair of SNodes in the VLink's endpoints' location constraint set C(ū) and generate the allowed set of candidate SPaths $P_{\bar{e}}^i=\{p_1, p_2, \ldots p_i\}$. The process 720 moves to task block 726, where the process 720 performs binary searching to find the maximum number of available frequency slots that each VLink ē in the set of unmapped VLinks can use in the allowed set of candidate SPaths $P_{\bar{e}}^i=\{p_1, p_2, \ldots p_i\}$ without violating any latency in the latency constraint set $\mathcal{L}(\overline{G})$.

Finally, at task block 728, the process 720 returns the most constrained VLink e that maximizes the number of available frequency slots to be used to the process 700 at task block 706. Returning to FIG. 9, the process 700 advances to task block 708 where the process 700 removes the most constrained VLink ē from the set of unmapped virtual links and the process 700 proceeds to task block 710.

At task block 710, the process 700 passes the control to the process 730 in order to compute embedding of the selected most constrained VLink ē using the reach table R. As shown in FIG. 11, the process 730 begins at task block 732. At task block 732, the process 730 receives the set of k shortest SPath connecting the most constrained VLink ē and a set of data-rates that can be used for embedding the most constrained VLink ē.

The process 730 advances to task block 734 where the process 730 generates a set of all multi-sets of SPaths of size maximum up to q using the set of k shortest SPath as base set. The process 730 then advances to task block 736. At task block 736, the process 730 verifies that if there is any unexplored multi-set of SPath. If all the multi-sets of SPaths have been explored, the process 730 moves to task block 750. However, if there are some multi-sets of SPath to be explored, the process 730 advances to task block 738.

At task block 738, the process 730 verifies the SPaths in the selected unexplored multi-set of SPath follows the differential delay constraint. If the SPaths in the selected unexplored multi-set of SPath follows the differential delay constraint, the process 730 advances to task block 740, else the process 730 returns to task block 736.

At task block 740, the process 730 generates all multi-sets of data-rates with cardinality of the SPaths associates selected multi-set of SPaths using the set of data-rates as base set. As such, generates all multi-sets of data-rates is performed in such a manner that the sum of data-rates equals the demand associated with the most constrained VLink $\bar{e}$. The process 730 then advances to task block 742.

At task block 742, the process 730 verifies that if there is any unexplored multi-set of data-rates. If all the multi-sets of data-rates have been explored, the process 730 returns to task block 736. However, if there are some multi-sets of data-rates to be explored, the process 730 advances to task block 744 and provide a selected multi-set of data-rates.

At task block 744, the process 730 generates all the permutations of the selected multi-set of data-rates and moves to task block 746. At task block 744, the process 730 verifies that if there is any unexplored permutation of the selected multi-set of data-rates. If all the permutations of the selected multi-set of data-rates have been explored, the process 730 returns to task block 738. However, if there are some permutations of the selected multi-set of data-rates to be explored, the process 730 advances to task block 748 and provide selected SPaths and data-rates of the multi-set.

At task block 748, the process 730 computes a tuple t=(d, b, m, f) and assigns frequency slots using dynamic programming with the selected SPaths and data-rates of the multi-set. Finally, at task block 750, the process 730 returns SPath, data-rates and frequency slots of the multi-set that maximizes the spectrum usage to be used to the process 700 at task block 710. Returning to FIG. 9, the process 700 advances to task block 712 where the process 700 verifies if the embedding was successful or failed. If the embedding was successful, the process 700 proceeds to task block 714. If the embedding was failed, the process advances to task block 716.

At task block 714, the process 700 update the resources associated with the physical/substrate elastic optical network in accordance with the computed embedding and the computed virtual link embedding is added to the solution and the process 700 returns task block 704.

At task block 716, the process 700 returns that heuristic process could not find a feasible embedding. Finally, at task block 718, the process 700 returns the solution.

Figure 12:
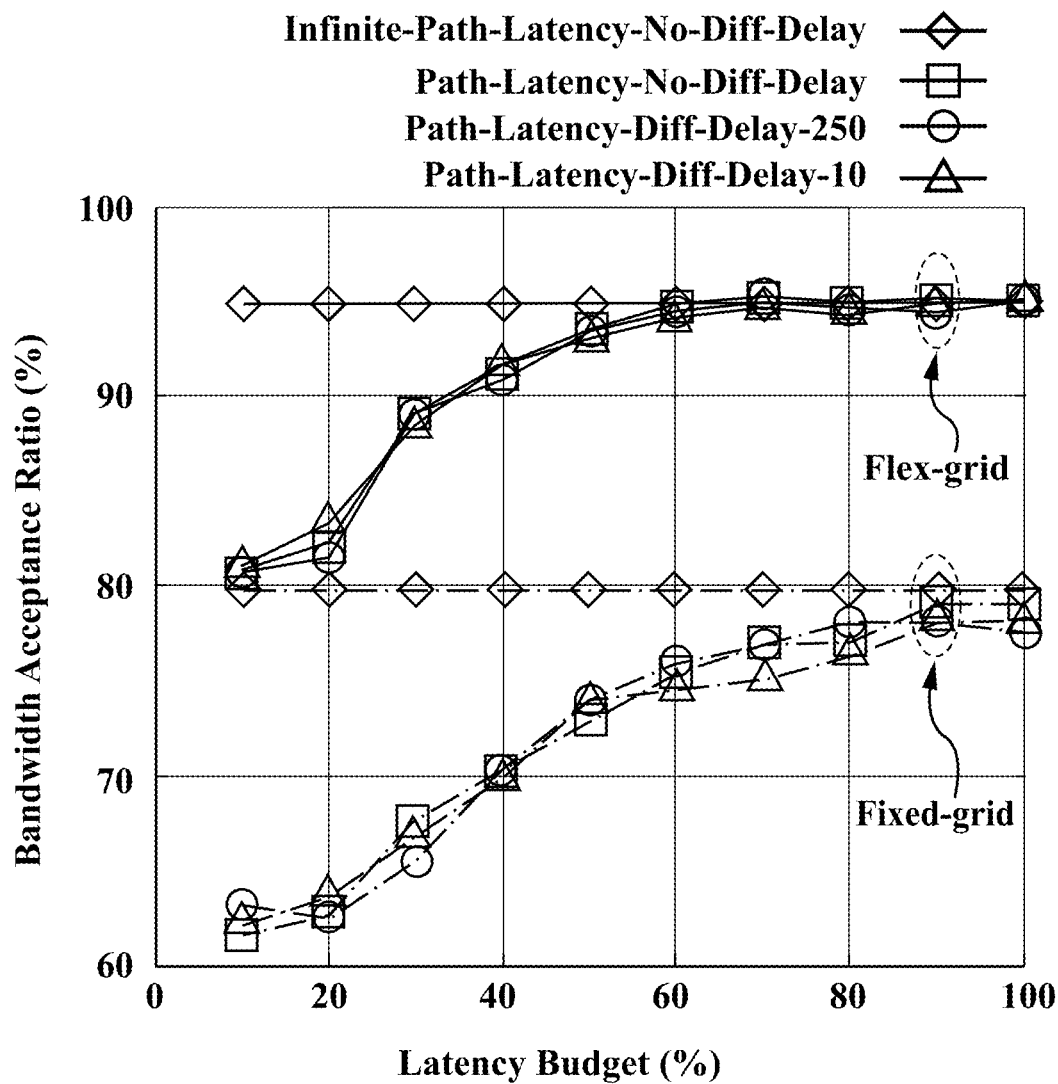
FIGS. 12, 13, and 14 illustrate various representative scenarios comparing performance of a fixed grid network and elastic optical network implementing for same virtual network, in accordance with various embodiments of present disclosure.
Figure 13:
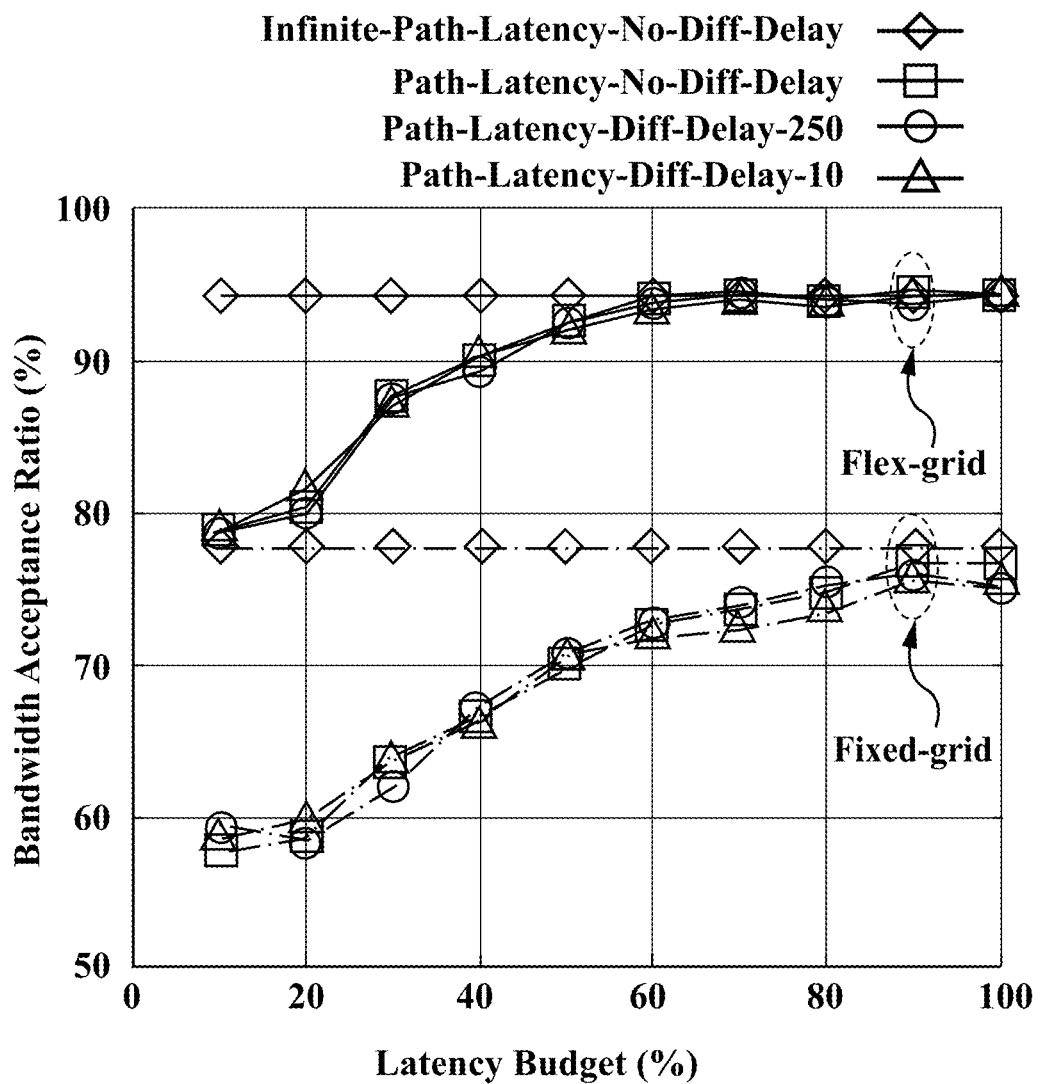
Figure 14:
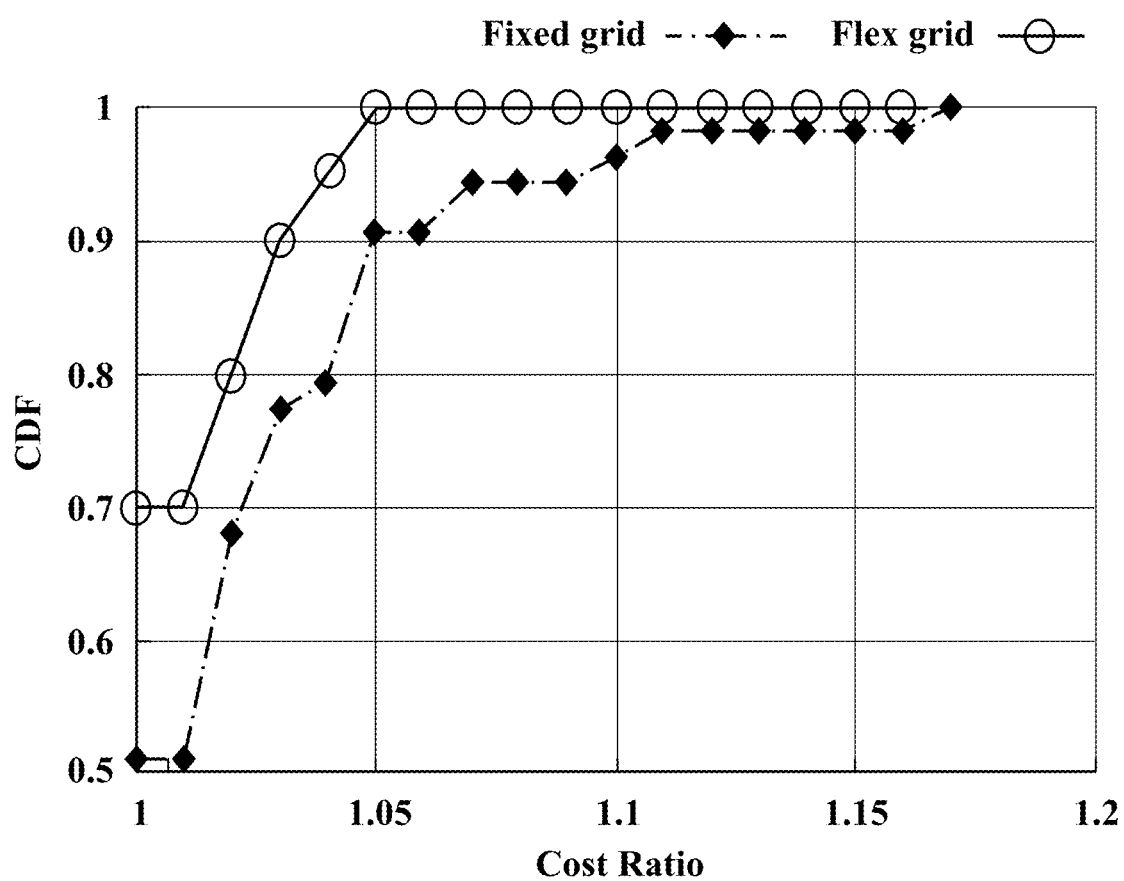

FIGS. 12-14 illustrate various representative scenarios comparing performance in a fixed grid network and an elastic optical network implementing the same virtual network embedding, in accordance with various embodiments of present disclosure. As shown, FIG. 12 depicts acceptance ratio (%) versus latency budget (%), for fixed grid network and elastic optical network (flexi grid network) corresponding to different differential delays. The acceptance ratio is a ratio of number of request accepted for the virtual network to the number total request for the virtual network. As depicted, the maximum acceptance ratio for fixed grid network is approximately 80%, whereas the maximum acceptance ratio for elastic optical network increases to approximately 95%.

As shown, FIG. 13 depicts acceptance ratio (%) versus latency budget (%), for fixed grid network and elastic optical network (flexi grid network) corresponding to different differential delays. The bandwidth acceptance ratio is a ratio of number of request accepted corresponding to the bandwidth request for the virtual network to the number total request for the virtual network. As depicted, the maximum acceptance ratio for fixed grid network is approximately 78%, whereas the maximum acceptance ratio for elastic optical network is approximately 95%.

FIG. 14 illustrates the cumulative distribution function (CDF) of cost ratios for fixed grid network and elastic optical network (flexi grid network). The cost ratio is obtained by two different approaches (ILP formulation and heuristic approach) for solving the same problem instance. Cost ratio measures the relative performance of two approaches.

Figure 15:
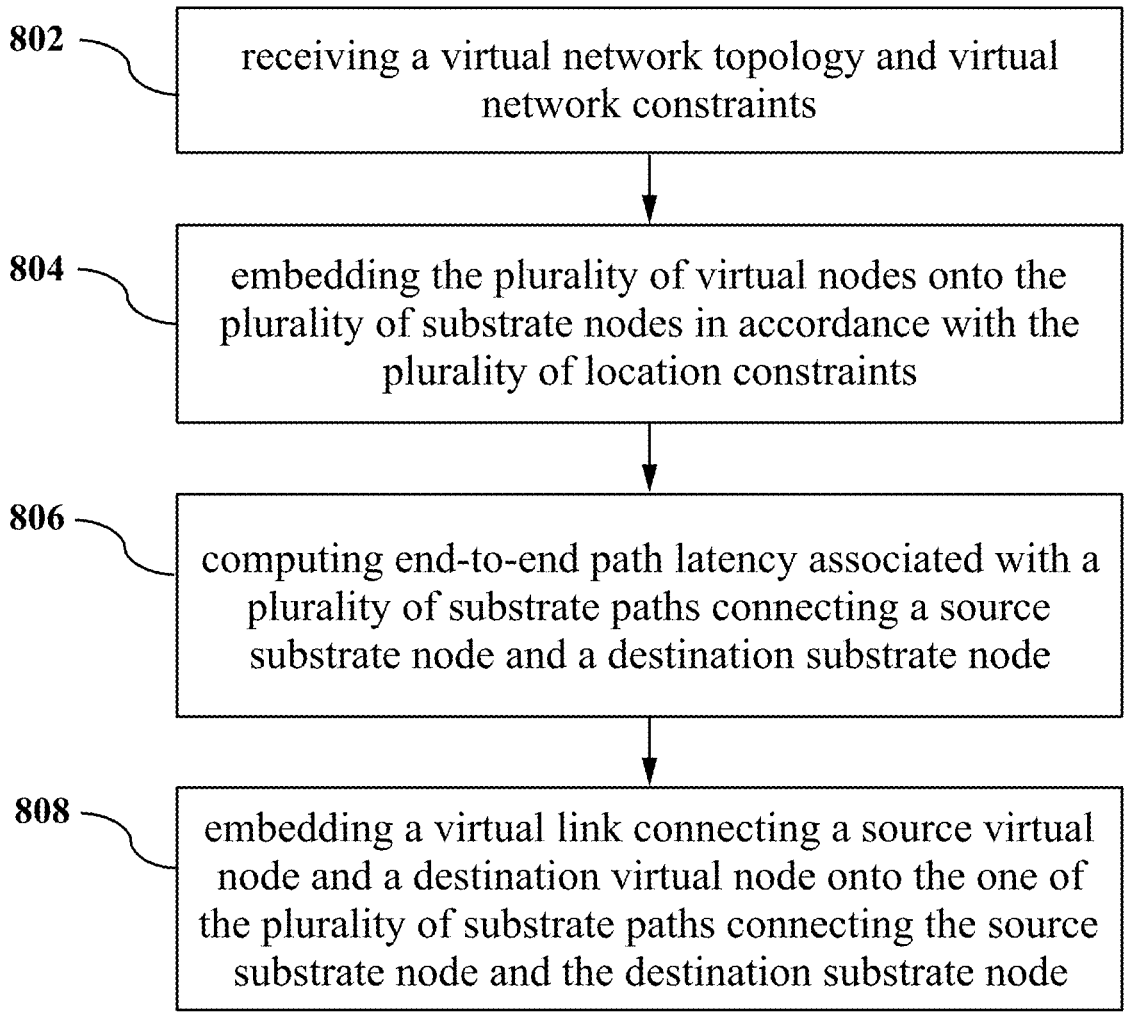
FIG. 15 depicts a functional flow diagram of a process directed to a method implemented in a system, in accordance with various embodiments of the present disclosure.

FIG. 15 depicts a functional flow diagram of process 800 directed to a method implemented in the system 100, in accordance with various embodiments of the present disclosure. The process 800 commences at task block 802, where the system 100 receive a virtual network topology and virtual network constraints, associated with the virtual network. As noted above, the system 400 may receive a request for a virtual network (e.g. virtual network 300), where the request may contain a virtual network topology and virtual network constraints associated with the virtual network. The virtual network topology may comprise VNodes (e.g. VNodes 302-1, 302-2, and 302-3), VLinks (e.g. VLinks 304-1 and 304-1), and a demand bandwidth associated with each of the VLinks.

The process 800 advances to task block 804, where the system 100 performs embedding the plurality of virtual nodes onto the plurality of substrate nodes in accordance with the plurality of location constraints. As noted above the latency-aware virtual network embedding system 500 may compute a node embedding function $\tau:\bar{V} \rightarrow V$, such that based on the node embedding function r the node embedding module 512 may perform embedding each VNode $\bar{u} \in \bar{V}$ to an SNode $u \in C(\bar{u})$ in accordance with their location constraints.

The process 800 advances to task block 806, where the system 100 computes end-to-end latency associated with a plurality of substrate paths connecting a source substrate node and a destination substrate node, wherein the plurality of substrate paths contain the plurality of substrate links and the plurality of substrate nodes. As discussed above, the latency-aware virtual network embedding system 500 may compute end-to-end latency (e.g. end-to-end latency $\ell^{\bar{a}}$) associated with SPaths connecting a source SNode (e.g SNode 202-1) and a destination SNode (e.g. 202-3), wherein the SPaths may contain Slinks (e.g. Slinks 204-1, 204-2, 204-4, 204-7) and SNodes (e.g. SNodes 202-1, 202-2, 202-3, 202-9).

Finally, at task block 808, where the system 100 performs embedding a virtual link connecting a source virtual node and a destination virtual node onto the one of the plurality of substrate paths connecting the source substrate node and the destination substrate node, wherein the end-to-end latency associated with the one of the plurality of substrate paths is less than or equal to a maximum allowable latency for the virtual link.

As noted above, the latency-aware virtual network embedding system 500 may embed a VLink (e.g. VLink 304-1) connecting a source VNode (e.g. VNode 302-1) and a destination VNode (e.g. VNode 302-1) onto the one of the SPaths connecting the source SNode (e.g. SNode 202-1) and the destination SNode (e.g. SNode 202-3), wherein the end-to-end latency (e.g. end-to-end latency $\ell^{\bar{a}}$) associated with the one of the SPaths is less than or equal to a maximum allowable end-to-end latency L for the VLink (e.g. VLink 304-1)

Those skilled in the art will appreciate that where conventional systems may take into account link budgets in determining latency, these approaches have all been based on the assumption that the links for which latency budgets are calculated are real physical links and are not logical links atop a virtualized system. In the above discussion, a request for the creation of a virtual network atop a substrate network is received. The virtual network can be defined by a topology and a set of constraints. Constraints associated with virtual nodes may include location based constraints, processing and storage based constraints and other such requirements. The links between the virtual nodes may have a set of constraints, including a latency constraint. When mapping the virtual nodes to a substrate node, the requirement of being able to connect to the substrate node supporting a second virtual node while supporting the latency constraint has to be taken into account. Through the use of flex-grid optical networks, as well as EONs, different physical link parameters can be evaluated. As the number of nodes and links in the virtual network increases, the number of possible configurations increases. By breaking the assignment problem into a series of smaller steps, the constraints can be met in a manner that is suitable for a dynamic environment. The use of either an ILP approach or a heuristic approach can be supported so that the latency requirements can be satisfied.

It will be appreciated that the process 700, 720, 730, and 800 may also be performed by computer programs, which may exist in a variety of forms both active and inactive. Such as, the computer programs may exist as software program(s) comprised of program instructions in source code, object code, executable code or other formats. Any of the above may be embodied on a computer readable medium, which include storage devices and signals, in compressed or uncompressed form. Representative non-transitory computer readable storage devices include conventional computer RAM (random access memory), ROM (read only memory), EPROM (erasable, programmable ROM), EEPROM (electrically erasable, programmable ROM), and magnetic or optical disks or tapes. Representative computer readable signals, whether modulated using a carrier or not, are signals that a computer hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

Thus, by virtue of techniques provided by the system 100, performing virtual network embedding on elastic optical network in accordance with end-to-path latency allows more flexible latency allocation over its constituent virtual links, enabling more opportunities to optimize substrate paths for embedding It is to be understood that the operations and functionality of the system 100, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for latency-aware embedding of a virtual network onto a substrate optical network comprising a plurality of substrate nodes and a plurality of substrate links connecting the substrate nodes, the method comprising:
   receiving a request for implementing a virtual network, the request comprising a virtual network topology and virtual network constraints associated with the virtual network, the virtual network to be embedded onto the substrate optical network, the virtual network topology comprising:
      a plurality of virtual nodes;
      a plurality of virtual links connecting the virtual nodes; and
      a demand bandwidth associated with each of the plurality of virtual links;
   the virtual network constraints comprising:
      a plurality of location constraints, each of the plurality of location constraints being associated with at least one of the plurality of virtual nodes, the plurality of location constraints each providing an indication of a substrate node onto which one the at least one of the plurality of virtual nodes can be embedded; and
      a latency constraint set associated with at least one of a plurality of virtual paths spanning the plurality of virtual links in the virtual network, the latency constraint set including differential delay requirements and separate latency constraints;
   generating a plan for embedding the virtual network onto the substrate optical network comprising:
      a mapping of the plurality of virtual nodes onto the plurality of substrate nodes in accordance with the plurality of location constraints; and
      a mapping of virtual links between the plurality of virtual nodes to the plurality of substrate paths connecting the plurality of substrate nodes via the plurality of substrate links in accordance with the latency constraint set,
   wherein to determine the mapping of virtual links, for each virtual path spanning the plurality of substrate paths, a summation of latencies of virtual links in the virtual path is determined to be allowable in accordance with the latency constraint set for the virtual path.

2. The method of claim 1,
   wherein, the summation of latencies of the virtual links in the virtual path is computed as latency ($\ell^{\bar{a}}$)=$\Sigma_{\bar{e} \in \bar{a}}$ latency ($\bar{e}$),
   wherein, the latency ($\bar{e}$) associated with one of the virtual links is less than or equal to $$\max_{p \in P_{\bar{e}}} L_p,$$

wherein, $L_p$ is latency of one of the plurality of substrate paths p and is computed as:

$$L_p = L_n + len(p)L_{prop} + n_{amp}(p)L_{amp} + (|p|+1)L_{roadm}$$

wherein:
$\ell^{\bar{a}}$ the latency of the virtual path;
$\bar{a}$ is the virtual path;
$\bar{e}$ is the virtual link included in the virtual path $\bar{a}$;
latency $(\bar{e})$ is the latency of the virtual link $\bar{e}$;
$P_{\bar{e}}$ is a set of substrate paths used for embedding splitting of the plurality of virtual links $\bar{e} \in \bar{E}$;
$L_n$, is a delay introduced at the source substrate node and the destination substrate node;
len(p) is a physical length of the one of the plurality of substrate paths p;
$L_{prop}$ is a propagation delay;
$n_{amp}$ is a total number of amplifiers associated with the one of the plurality of substrate paths p;
$L_{amp}$ is a delay introduced by one of the amplifiers associated with the one of the plurality of substrate paths p;
|p| is a total number of the plurality of substrate links associated with the one of the plurality of substrate paths p; and
$L_{roadm}$ is a delay introduced by a reconfigurable optical add-drop multiplexer (ROADM) present along the one of the plurality of substrate paths p.

3. The method of claim 2, wherein a differential delay requirement given by:

$$\forall \bar{e} \in \bar{E}: \left(\max_{p \in P\bar{e}} L_p - \min_{p \in P\bar{e}} L_p\right) \le DD_{max}$$

wherein:
$\bar{E}$ is a set of individual virtual links $\bar{e}$;
$DD_{max}$ is a maximum allowable differential delay.

4. The method of claim 2, wherein generating the plan further comprises using an integer linear programming (ILP) formulation.

5. The method of claim 4, wherein the ILP formulation comprises the following objective function:

$$\text{minimize}\left(\sum_{\forall \bar{e} \in \bar{E}} \sum_{\forall p \in P_{\bar{e}}^k} \sum_{\forall t \in T_{\bar{e}p}} \sum_{i=1}^q \sum_{\forall s \in S} y_{\bar{e}ptis} \times |p| + \in_1 \right.$$
$$\left. \sum_{\forall \bar{e} \in \bar{E}} \sum_{\forall p \in P_{\bar{e}}^k} \sum_{\forall t \in T_{\bar{e}p}} \sum_{i=1}^q \sum_{\forall s \in S} y_{\bar{e}ptis} \times len(p) + \in_2 \sum_{\forall \bar{e} \in \bar{E}} \sum_{\forall p \in P_{\bar{e}}^k} \sum_{\forall t \in T_{\bar{e}p}} \sum_{i=1}^q w_{\bar{e}pti}\right)$$

wherein:
$P_{\bar{e}}^k$ is set of k shortest substrate paths connecting the source substrate node and the destination substrate node for each virtual link $\bar{e} \in \bar{E}$;
$T_{\bar{e}p}$ is a set of admissible transmission configurations t;
q is a maximum number of allowable splits in the one of the k shortest substrate paths;
S is a set of equal-width frequency slots s;
$\in_1$ is selected in a manner that the second term in the objective function is effective only when multiple solutions have same value for the first part;
$\in_2$ is selected in a manner that the third term in the objective function is effective only when multiple solutions have same value for the first part and second part;

$y_{\bar{e}ptis}$ is a relationship between the one of the k shortest substrate paths, frequency slots s associated with the plurality of substrate links between the one of the k shortest substrate paths, one of the virtual links $\bar{e}$, one of the admissible transmission configurations t, and one of the allowable splits;
$w_{\bar{e}pti}$ is a relationship between the one of the k shortest substrate paths, one of the virtual links $\bar{e}$, one of the admissible transmission configurations t, and one of the allowable splits.

6. The method of claim 5, wherein $y_{\bar{e}ptis}$ is given by:

$$y_{\bar{e}ptis} = \begin{cases} 1 & \text{if } \bar{e} \in \bar{E} \text{ uses } s \in S \text{ on path } p \in P_{\bar{e}}^k \text{ with} \\ & \text{the } i-th \text{ instance of } t \in T_{\bar{e}p} \\ 0 & \text{Otherwise} \end{cases}$$

7. The method of claim 5, wherein $w_{\bar{e}pti}$ given by:

$$w_{\bar{e}pti} = \begin{cases} 1 & \text{if } \bar{e} \in \bar{E} \text{ uses } i-th \text{ instance of } t \in T_{\bar{e}p} \text{ on} \\ & \text{path } p \in P_{\bar{e}}^k \\ 0 & \text{Otherwise} \end{cases}$$

8. The method of claim 5, wherein each of the admissible transmission configuration t is comprising of a specific baud-rate b, a modulation format m and a forward error correction code (FEC) overhead f.

9. The method of claim 2, wherein the substrate optical network in an Elastic Optical network.

10. The method of claim 2, wherein generating the plan further comprises using a heuristic approach.

11. The method of claim 10, wherein the heuristic approach further comprises:
estimating an upper bound of latency budget in accordance with the set of latency constraints associated with the plurality of virtual paths;
generating an allowed set of substrate paths for embedding the plurality of virtual links based on the upper bound of the latency budget;
selecting a most constrained virtual link from a set of unmapped virtual links and the plurality of virtual links associated with the allowed set of substrate paths, wherein the most constrained virtual link is quantified in terms of end-to end path latency as well as in terms of in terms of availability of frequency slots;
computing an optimal solution for the one of the plurality of substrate paths connecting the source substrate node and the destination substrate node based on the selected most constrained virtual link, the allowed set of substrate paths, and a set of admissible transmission configurations t; and
allocating frequency slots to the plurality of substrate links associated with the one of the plurality of substrate paths.

12. The method of claim 11, wherein the allocating of frequency slots comprises allocating same contiguous set of frequency slots to all of the plurality of substrate links connecting the source substrate node and the destination substrate node.

13. The method of claim 11, wherein selecting the most constrained virtual link further comprising ordering the set of unmapped virtual links and virtual links associated with the allowed set of substrate paths in accordance with associated number of usable frequency slots and latency constraints less than or equal to a maximum allowable latency for the virtual link.

14. The method of claim 11, wherein computing the optimal solution is based on maximum allowable latency for the virtual link and at least one of a minimum frequency slot requirement, load balancing, and minimum blocking probability.

15. A system for latency-aware embedding of a virtual network onto a substrate optical network comprising a plurality of substrate nodes and a plurality of substrate links connecting the substrate nodes, the method comprising:
a processing unit for executing instructions; and
a memory unit for storing instructions, which when executed by the processor configures the system to perform steps for:
receiving a virtual network topology and virtual network constraints, associated with the virtual network, for embedding onto the substrate optical network, the virtual network topology comprising:
a plurality of virtual nodes;
a plurality of virtual links connecting the virtual nodes; and
a demand bandwidth associated with each of the plurality of virtual links;
the virtual network constraints comprising:
a plurality of location constraints, each of the plurality of location constraints being associated with the plurality of virtual nodes, each location constraint providing an indication of at least one of the plurality of substrate nodes onto which one of the plurality of virtual nodes can be embedded;
a latency constraint set associated with at least one of a plurality of virtual paths spanning the plurality of virtual links in the virtual network, the latency constraint set including differential delay requirements and separate latency constraints;
generating a plan for embedding the virtual network onto the substrate optical network comprising:
a mapping of the plurality of virtual nodes onto the plurality of substrate nodes in accordance with the plurality of location constraints; and
a mapping of the plurality of virtual links between the plurality of virtual nodes to the plurality of substrate paths connecting the plurality of substrate nodes via the plurality of substrate links in accordance with the latency constraint set,
wherein, to determine the mapping of virtual links, for each virtual path spanning the plurality of substrate paths, a summation of latencies of virtual links in the virtual path is determined to be allowable in accordance with the latency constraint set for the virtual path.

16. The system of claim 15,
wherein, the summation of latencies of the virtual links in the virtual path is computed as latency $(\ell^{\bar{a}}) = \Sigma_{\bar{e} \in \bar{a}}$ latency $(\bar{e})$
wherein, the latency $(\bar{e})$ associated with one of the virtual links is less than or equal to $$\max_{p \in P_{\bar{e}}} L_p,$$

wherein, $L_p$ is latency of one of the plurality of substrate paths p and is computed as:

$$L_p = L_n + len(p)L_{prop} + n_{amp}(p)L_{amp} + (|p|1)L_{roadm}$$

wherein:
$\ell^{\bar{a}}$ the latency of the virtual path;
$\bar{a}$ is the virtual path;
$\bar{e}$ is the virtual link included in the virtual path $\bar{a}$;
latency $(\bar{e})$ is the latency of the virtual link $\bar{e}$;
$P_{\bar{e}}$ is a set of substrate paths used for embedding splitting of the plurality of virtual links $\bar{e} \in \bar{E}$;
$L_n$ is a delay introduced at the source substrate node and the destination substrate node;
len(p) is a physical length of the one of the plurality of substrate paths p;
$L_{prop}$ is a propagation delay;
$n_{amp}$ is a total number of amplifiers associated with the one of the plurality of substrate paths p;
$L_{amp}$ is a delay introduced by one of the amplifiers associated with the one of the plurality of substrate paths p;
|p| is a total number of the plurality of substrate links associated with the one of the plurality of substrate paths p; and
$L_{roadm}$ is a delay introduced by a reconfigurable optical add-drop multiplexer (ROADM) present along the one of the plurality of substrate paths p.

17. The system of claim 16, further comprising determining the embedding of the virtual network using an integer linear programming (ILP) formulation.

18. The system of claim 17, wherein the ILP formulation comprises the following objective function:

$$\text{minimize}\left( \sum_{\forall \bar{e} \in \bar{E}} \sum_{\forall p \in P_{\bar{e}}^k} \sum_{\forall t \in T_{\bar{e}p}} \sum_{i=1}^{q} \sum_{\forall s \in S} y_{\bar{e}ptis} \times |p| + \in_1 \right.$$

$$\sum_{\forall \bar{e} \in \bar{E}} \sum_{\forall p \in P_{\bar{e}}^k} \sum_{\forall t \in T_{\bar{e}p}} \sum_{i=1}^{q} \sum_{\forall s \in S} y_{\bar{e}ptis} \times len(p) + \in_2$$

$$\left. \sum_{\forall \bar{e} \in \bar{E}} \sum_{\forall p \in P_{\bar{e}}^k} \sum_{\forall t \in T_{\bar{e}p}} \sum_{i=1}^{q} w_{\bar{e}pti} \right)$$

wherein:
$P_{\bar{e}}^k$ is set of k shortest substrate paths connecting the source substrate node and the destination substrate node for each virtual link $\bar{e} \in \bar{E}$;
$T_{\bar{e}p}$ is a set of admissible transmission configurations t;
q is a maximum number of allowable splits in the one of the k shortest substrate paths;
S is a set of equal-width frequency slots s;
$\in_1$ is selected in a manner that the second term in the objective function is effective only when multiple solutions have same value for the first part;
$\in_2$ is selected in a manner that the third term in the objective function is effective only when multiple solutions have same value for the first part and second part;
$y_{\bar{e}ptis}$ is a relationship between the one of the k shortest substrate paths, frequency slots s associated with the plurality of substrate links between the one of the k shortest substrate paths, one of the virtual links $\bar{e}$, one of the admissible transmission configurations t, and one of the allowable splits;

$w_{\bar{e}pti}$ is a relationship between the one of the k shortest substrate paths, one of the virtual links $\bar{e}$, one of the admissible transmission configurations t, and one of the allowable splits.

19. The system of claim 16, wherein the substrate optical network in an Elastic Optical network.

20. The system of claim 16, further comprising determining the embedding of the virtual network using a heuristic approach.

21. The system of claim 20, wherein the heuristic approach further comprises:
   estimating an upper bound of latency budget in accordance with the set of latency constraints associated with the plurality of virtual paths;
   generating an allowed set of substrate paths for embedding the plurality of virtual links based on the upper bound of the latency budget;
   selecting a most constrained virtual link from a set of unmapped virtual links and the plurality of virtual links associated with the allowed set of substrate paths, wherein the most constrained virtual link is quantified in terms of latency as well as in terms of in terms of availability of frequency slots;
   computing an optimal solution for the one of the plurality of substrate paths connecting the source substrate node and the destination substrate node based on the selected most constrained virtual link, the allowed set of substrate paths, and a set of admissible transmission configurations t; and
   allocating frequency slots to the plurality of substrate links associated with the one of the plurality of substrate paths.

* * * * *